(12) United States Patent
Inoue et al.

(10) Patent No.: US 6,442,450 B1
(45) Date of Patent: Aug. 27, 2002

(54) ROBOT DEVICE AND MOTION CONTROL METHOD

(75) Inventors: Makoto Inoue; Taku Yokoyama, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/646,506

(22) PCT Filed: Jan. 20, 2000

(86) PCT No.: PCT/JP00/00263

§ 371 (c)(1),
(2), (4) Date: Nov. 9, 2000

(87) PCT Pub. No.: WO00/43167

PCT Pub. Date: Jul. 27, 2000

(30) Foreign Application Priority Data

Jan. 20, 1999 (JP) .......................................... 11-012292
Nov. 30, 1999 (JP) .......................................... 11-341374

(51) Int. Cl.⁷ ............................................. G06F 19/00
(52) U.S. Cl. .................. 700/245; 700/248; 700/258; 700/259; 700/260; 700/263; 318/568.1; 318/568.11; 318/568.12; 318/568.2; 318/565
(58) Field of Search ............................. 700/245, 17, 56, 700/83, 86, 260, 263, 31, 248, 258, 259; 318/568.1, 16, 568.11, 568.12, 568.2, 565; 382/209, 181, 190; 710/7, 20; 348/110, 27, 734; 345/473, 520; 901/1, 15, 47

(56) References Cited

FOREIGN PATENT DOCUMENTS

| JP | 5-73143 | 3/1993 |
|----|---------|--------|
| JP | 7-104778 | 4/1995 |
| JP | 8-76810 | 3/1996 |
| JP | 9-34698 | 2/1997 |
| JP | 9-114514 | 5/1997 |
| JP | 10-27182 | 1/1998 |
| JP | 10-289006 | 10/1998 |

OTHER PUBLICATIONS

Varchavskaia, A protolanguage for an infant robot. 2000, Iternet, pp. 1–2.*

Breazeal, Learning social behaviors during human–robot play, 2000, Internet, pp. 1–2.*

Sony Electronics, Inc, AIBO, 2000, Advertising paper, p. 1.*

Masahiro Fujita et al., Reconfigurable Physical Agents, Proceedings of the Second International Conference on Autonomous Agents, May 9, 1998, p. 54–61.

M. Okado, et al., "Interactive Pet Robot having Emotion", Omron Technics 128, 1998 vol. 38, No. 4, p. 428–432.

* cited by examiner

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer; Darren M. Simon

(57) ABSTRACT

The robot apparatus of the present invention autonomously makes natural motions. The robot apparatus is provided with a control means 32, which has a feeling/instinct model that causes a motion and changes the feeling/instinct model based on input information S1 to S3 thereby to determine a motion. As a result of this, the robot apparatus 1 can autonomously act based on the state of its own feeling/instinct. A robot apparatus which can autonomously make natural motions can thus be realized.

49 Claims, 27 Drawing Sheets

| MOTION | PARAMETER | CONTENTS |
|---|---|---|
| "ONE-STEP-WALK" | 3 | WALK 3 STEPS |
| "ONE-STEP-WALK" | 7 | WALK 7 STEPS |
| "ONE-STEP-WALK" | -1 | KEEP WALKING UNTIL ANOTHER INSTRUCTION IS SUPPLIED TO LEGS |

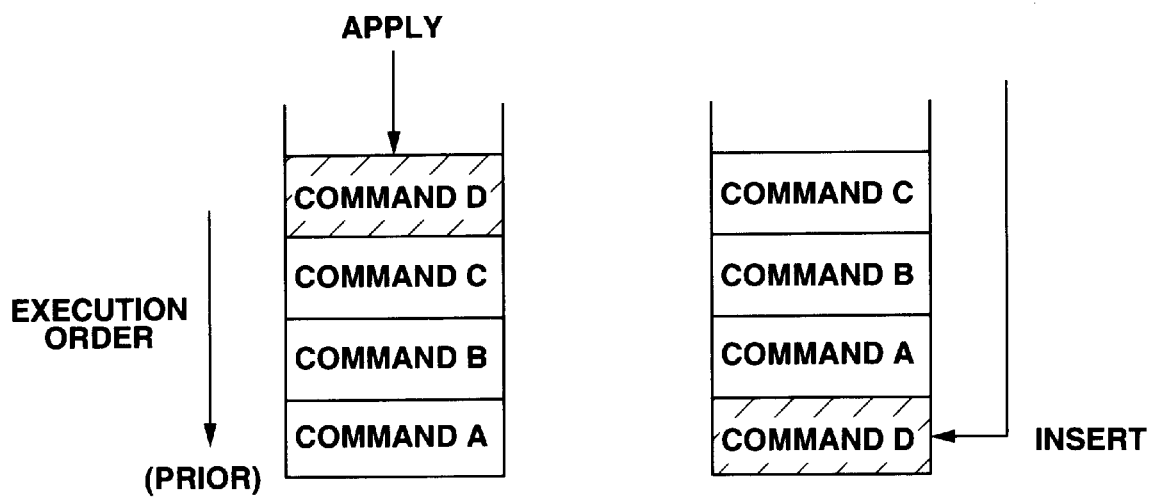
FIG.25A  FIG.25B
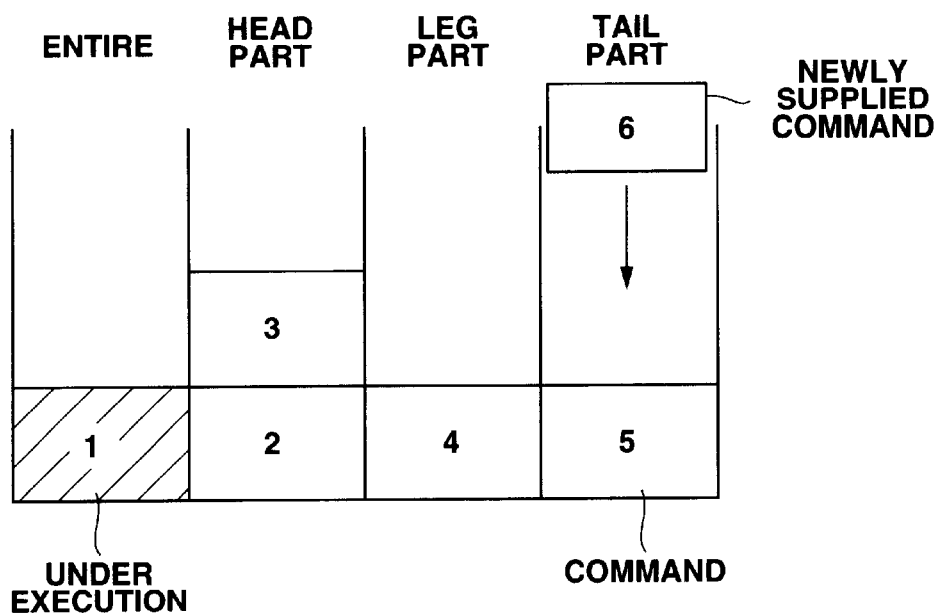
FIG.26

ROBOT DEVICE AND MOTION CONTROL METHOD

TECHNICAL FIELD

The present invention relates to a robot apparatus and a motion control method and is preferably applied to a robot apparatus which behaves like a quadruped.

BACKGROUND ART

Proposals and developments have been made in quadruped robot apparatuses, articulated robots, or animations using characters who move via computer graphics, which operate in accordance with commands from a user or environments. These robot apparatuses and animations (which are referred together robot apparatuses) carry out a series of motion based on a command from a user.

For example, a so-called pet robot as a robot apparatus having a shape similar to a quadruped like a dog takes a position of "Down" when it receives a command of "Down", or it always gives a hand whenever a user puts a hand before the mouth of the dog.

Meanwhile, it is desirable that the motion of the robot apparatus which simulates an animal should be similar to that of an actual animal as much as possible.

However, conventional robot apparatuses do only predetermined motions based on commands from a user or the environment. Thus, since conventional robot apparatuses do not autonomously move unlike actual animals, it has not been possible to satisfy a users' request that they want a robot apparatus that can autonomously determine its behaviors.

Further, robot apparatuses reach an aimed position or motion through a predetermined position or motion. However, motion expression of robot apparatuses become rich if there are prepared a plurality of positions or motions to be carried out during transition to an aimed position or motion.

If there are prepared a plurality of ways of positions or motions which a robot apparatus takes halfway before reaching an aimed position or motion, it is preferred that a position or motion which the robot apparatus passes is selected optimally to transit to the aimed position or motion.

DISCLOSURE OF THE INVENTION

The present invention has been made in view of the above situation, and has an object of proposing a robot apparatus which autonomously makes natural motions and a motion control method thereof.

Also, the present invention has been made in view of the above situation, and has an object of providing a robot apparatus whose positions and motions are optimized during transition, and a motion control method thereof.

More specifically, a robot apparatus according to the present invention makes a motion corresponding to supplied input information, and comprises model change means including a model for causing the motion, for determining the motion by changing the model, based on the input information.

The robot apparatus having this structure has a model which causes a motion, and changes the model based on input information thereby to determine a motion. Therefore, if the model is a feeling model or an instinct model, the robot apparatus autonomously acts based on states of the feeling and the instinct of the robot apparatus.

A motion control method according to the present invention is to make a motion in accordance with supplied input information, and the motion is determined by changing a model which causes the motion, based on the input information.

In this motion control method, a motion is determined by changing the model, based on input information. If the model is a feeling model or an instinct model, the robot apparatus can act autonomously based on its own feeling or instinct.

Another robot apparatus according to the present invention makes a motion in accordance with supplied input information, and comprises motion determination means for determining a next operation subsequent to a current motion, based on the current motion and the input information supplied next, said current motion corresponding to a history of input information supplied sequentially.

The robot apparatus having this structure determines a next motion subsequent to a current motion, based on the current motion corresponding to a history of input information supplied sequentially, and input information to be supplied next. Therefore, the robot apparatus autonomously acts based on the states of its own feeling or instinct.

Another motion control method according to the present invention is to make a motion in accordance with supplied input information, and a next motion subsequent to a current motion is determined, based on the current motion and the input information to be supplied next, the current motion corresponding to a history of input information supplied sequentially.

In this motion control method, a next motion subsequent to a current motion is determined, based on the current motion corresponding to the history of input information sequentially supplied, and input information to be supplied next. Therefore, the robot apparatus can act autonomously, based on the state of its own feeling or instinct.

Further, another robot apparatus according to the present invention comprises: graph storage means for storing a graph which registers the positions and the motion and which is constructed by connecting the positions with the motion for letting the positions transit; and control means for searching a route from a current position to an aimed position or motion, on the graph, based on the action command information, and for letting the robot apparatus move, based on a search result, thereby to let the robot apparatus transit from the current position to the aimed position or motion.

The robot apparatus having this structure transits to an aimed position or motion instructed by the action command information, based on a graph which registers positions and motions stored in graph storage means and which is constructed by connecting the positions with motions for letting the positions transit. Specifically, the robot apparatus searches a route from the current position to an aimed position or motion, on the graph, based on action command information. Based on the search result, a motion is made to transit to an aimed position or motion from the current position.

Further, in another motion control method according to the present invention, based on action command information, a route from a current position to an aimed position or motion is searched on a graph which registers positions and motions and which is constructed by connecting the positions with motions for letting the positions transit, and a motion is made, based on a search result, thereby to make transit from the current position to the aimed position or motion.

That is, in this motion control method, transit to an aimed position or motion instructed by the action command information is made, based on a graph which registers positions and motions and which is constructed by connecting the positions with motions for letting the positions transit.

BRIEF DESCRIPTION OF THE DRAWINGS

FIG. 25A and 25B are views used for explaining processing of inserting a command.

FIG. 26 is a view showing a command storage part which can store commends corresponding to the entire apparatus and componential parts.

BEST MODE FOR CARRYING OUT THE INVENTION

In the following, embodiments of the present invention will be explained in more details.

(1) Structure of Robot Apparatus

Figure 1:
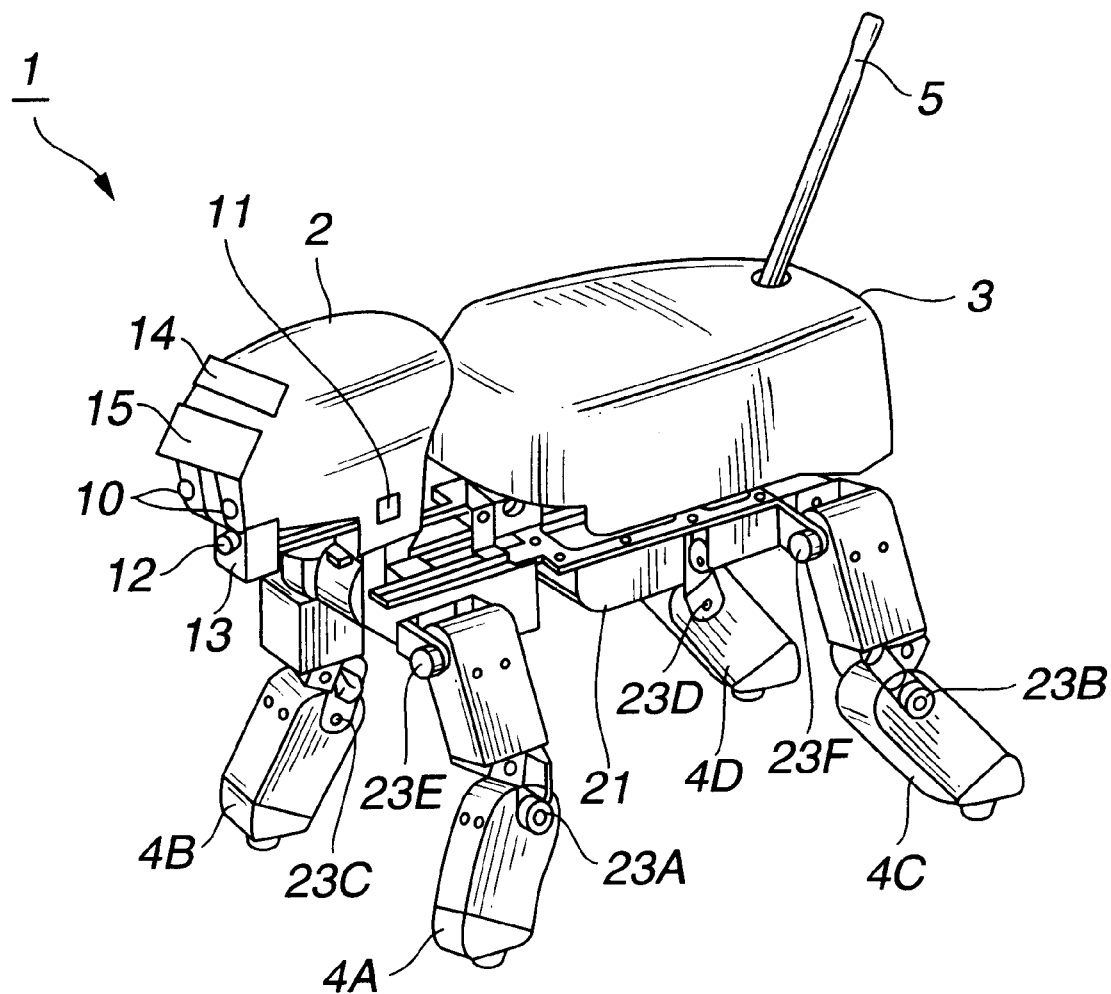
FIG. 1 is a perspective view showing an embodiment of a robot apparatus according to the present invention.

The entire robot apparatus 1 is constructed As shown in FIG. 1 and comprises a head part 2 corresponding to a head, a body part 3 corresponding to the trunk, leg parts 4A, 4B, 4C, and 4D corresponding to legs, and a tail part 5 corresponding to a tail. The robot apparatus 1 moves the head part 2, leg parts 4A to 4D, and tail part 5 in relation to the body part 3, thereby to move like an actual quadruped.

An image recognition part 10 equivalent to eyes and constructed, for example, by a CCD (Charge Coupled Device) camera for picking up images, a microphone 11 equivalent to ears for collecting voices, and a speaker 12 equivalent to a mouth for generating a voice are respectively equipped at predetermined position of the head part 2. Also, the head part 2 is equipped with a remote controller receiving part 13 for receiving commands transmitted through a remote controller (not shown) from a user, a touch sensor 14 for detecting contact of a hand of the user or the like, and a LED (Light Emitting Diode) 15 constructed by a light emitting means.

The body part 3 is equipped with a battery 21 at a position corresponding to its abdomen, and an electronic circuit (not shown) or the like is contained inside the body part 3.

Joint parts of the leg parts 4A to 4D, connecting parts between the leg parts 4A to 4D and the body part 3, a connecting part between the body part 3 and the head part 2, a connecting part between the body part 3 and the tail part 5 are connected by their own actuators 23A to 23N. These joint and connecting parts are driven on the basis of control by the electronic circuit contained in the body part 3. In the robot apparatus 1, the actuators 23A to 23N are driven to shake and nod the head part 2, wag the tail part 5, and move the leg parts 4A to 4D to walk. The robot apparatus 1 thus behaves like an actual quadruped.

For example, the robot apparatus 1 constructed as described above has the following features which will be explained in details later.

When the robot apparatus 1 is instructed to changes its position from a position (first position) to another position (second position), it does not directly change to the second position from the first position but it transits a prepared natural position.

Also, when the robot apparatus reaches a given position during the position transition, it can receive a notification.

The robot apparatus 1 is constructed by parts of a head, legs, and a tail, and can control independently the positions of these parts. For example, the positions of the head and legs can be controlled independently from each other. Also, the position of the entire apparatus including the head, legs, and tail can be managed separately from the respective parts.

It is also possible to transfer parameters which specify the details of motions to motion commands for the robot apparatus 1.

The robot apparatus 1 has the above-described features. Much more features will now be explained below including those described above.

(2) Circuit Configuration of Robot Apparatus

Figure 2:
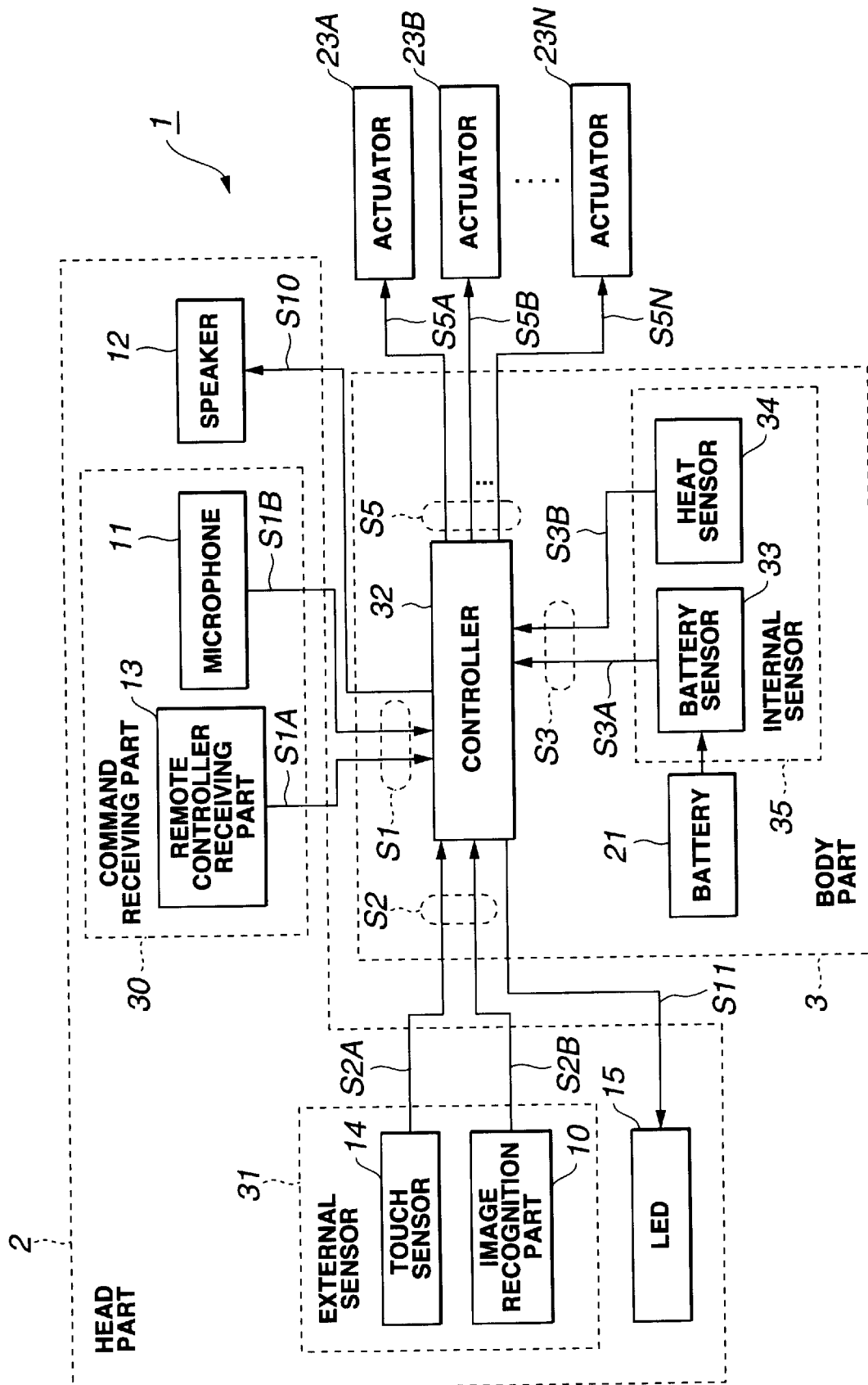
FIG. 2 is a block diagram showing a circuit diagram of the robot apparatus.

The circuit configuration of the robot apparatus 1 is as shown in FIG. 2, for example. The head part 2 comprises a command receiving part 30 constructed by a microphone 11 and a remote controller receiving part 13, an external sensor 31 constructed by an image recognition part 10 and a touch sensor 14, a speaker 12, and a LED 15. The body part 3 has a battery 21 and internally has a inner sensor 35 constructed by a controller 32 for controlling the operation of the entire robot apparatus 1, a battery sensor 33 for detecting the residue of the battery 21, and a heat sensor 34 for detecting head generated inside the robot apparatus 1. Further, actuators 23A to 23N are provided at predetermined positions of the robot apparatus 1, respectively.

The command receiving part 30 serves to receive commands such as "Walk", "Down", "Chase Ball", and the like that are supplied to the robot apparatus 1 from the user. This part 30 is constructed by a remote controller receiving part 13 and a microphone 11.

The remote controller receiving part 13 is receives a desired command inputted by a remote controller (not shown) operated by a user. For example, transmission of a command from the remote controller is achieved by infrared light. The remote controller receiving part 13 receives the infrared light, generates a receive signal S1A, and sends it to the controller 32.

The remote controller is not limited to the type of using infrared light but may be a type of supplying a command to the robot apparatus 1 by a tone scale. In this case, the robot apparatus 1 is arranged to perform processing in correspondence with the tone scale from the remote controller inputted through the microphone 11.

When a user gives a voice corresponding to a desired command, the microphone 11 collects the voice given by the user, generates a voice signal S1B, and sends it to the controller 32.

The command receiving part 30 generates a command signal S1 containing a receiving signal SZ1A and a voice signal S1B in accordance with the command given to the robot apparatus 1 by the user. The part 30 supplies this command signal to the controller 32.

The touch sensor 14 of the external sensor 31 serves to detect action on the robot apparatus 1 from the user, such as "Rub", "Hit", and the like. For example, when a user touches the touch sensor 14 to make a desired action, a contact detection signal S2A corresponding to the action is generated and sent to the controller 32.

The image recognition part 10 of the external sensor 31 recognizes the environment around the robot apparatus 1. As a result, the part 10 detects environmental information around the robot apparatus 1, such as "Dark", "Presence of a favorite toy", or the like, or detects an action of another robot apparatus, such as "Another robot is running", or the like. This image recognition part 10 sends an image signal S2B obtained as a result of picking up an environmental image, to the controller 32.

The external sensor 31 generates an external information signal S2 containing a contact detection signal S2A and an image signal S2B, in accordance with external information thus supplied from outside of the robot apparatus 1, and sends it to the controller 32.

The internal sensor 35 sensor to detect an inner state of the robot apparatus 1 itself, such as "Hungry" which means a low battery, "Fever", or the like. This sensor 35 is constructed by a battery sensor 33 and a heat sensor 34.

The battery sensor 33 serves to detect the residue of the battery 21 which supplies the power to respective circuits of the robot apparatus 1. This battery sensor 33 sends a battery capacitance detection signal S3A as a result of detection, to the controller 32. The heat sensor 34 serves to detect a heat inside the robot apparatus 1. This heat sensor 34 sends a heat detection signal S3B as a result of detection to the controller 32.

The internal sensor 35 thus generates an internal information signal S3 containing a battery capacitance detection signal S3A and a heat detection signal S3B in accordance with internal information of the robot apparatus 1, and sends it to the controller 32.

Based on the command signal S1 supplied from the command receiving part 30, the external information signal S2 supplied from the external sensor 31, and the internal information signal S3 supplied from the internal sensor 35, the controller 32 generates control signals S5A to S5N for driving the actuators 23A to 23N, respectively. The controller 32 sends these signals to the actuators, respectively, to drive them so that the robot apparatus 1 operates.

At this time, the controller 32 generates a voice signal S10 and a light emitting signal S11 to be outputted to the outside if necessary. Of these signals, the voice signal S10 is outputted to the outside through the speaker 12 and the light emitting signal S1 is sent to the LED 15 to obtain a desired light emitting output (e.g., flicker, color change, or the like). The user is thus notified of necessary information. For example, the robot apparatus 1 notifies the user of its own feeling. It is possible to provide an image display part for displaying an image, in place of the LED 15. Information necessary for a user, such as feeling or the like, can then be notified by displaying a desired image.

(3) Processing in Controller

Based on programs previously stored in a predetermined storage area, the controller 32 performs software processing on the command signal S1 supplied from the command receiving part 30, the external information signal S2 supplied from the external sensor 31, and the internal information signal S3 supplied from the internal sensor 35. The controller 32 supplies a control signal S5 obtained as a result of the software processing, the actuators 23.

The operations of the actuators 23 at this time are expressed as the motion of the robot apparatus 1. The present invention has as its object to enrich such expressions.

Figure 3:
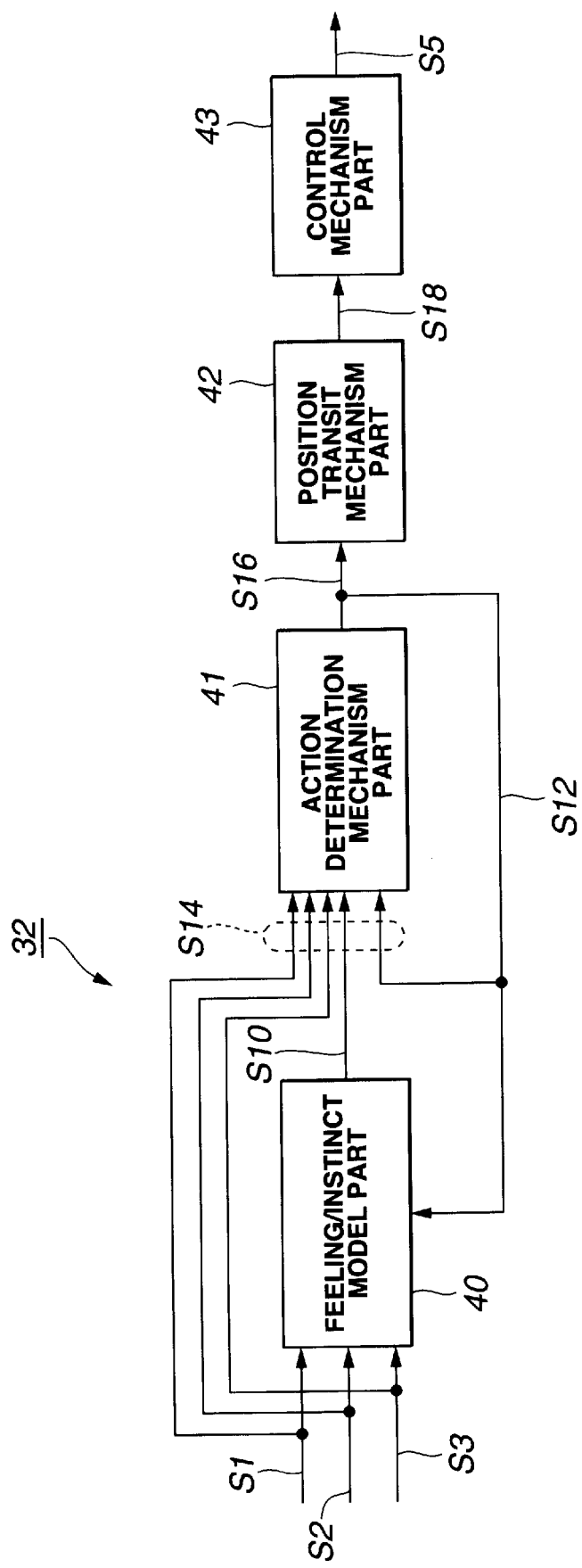
FIG. 3 is a schematic diagram showing data processing in a controller.
Figure 4:
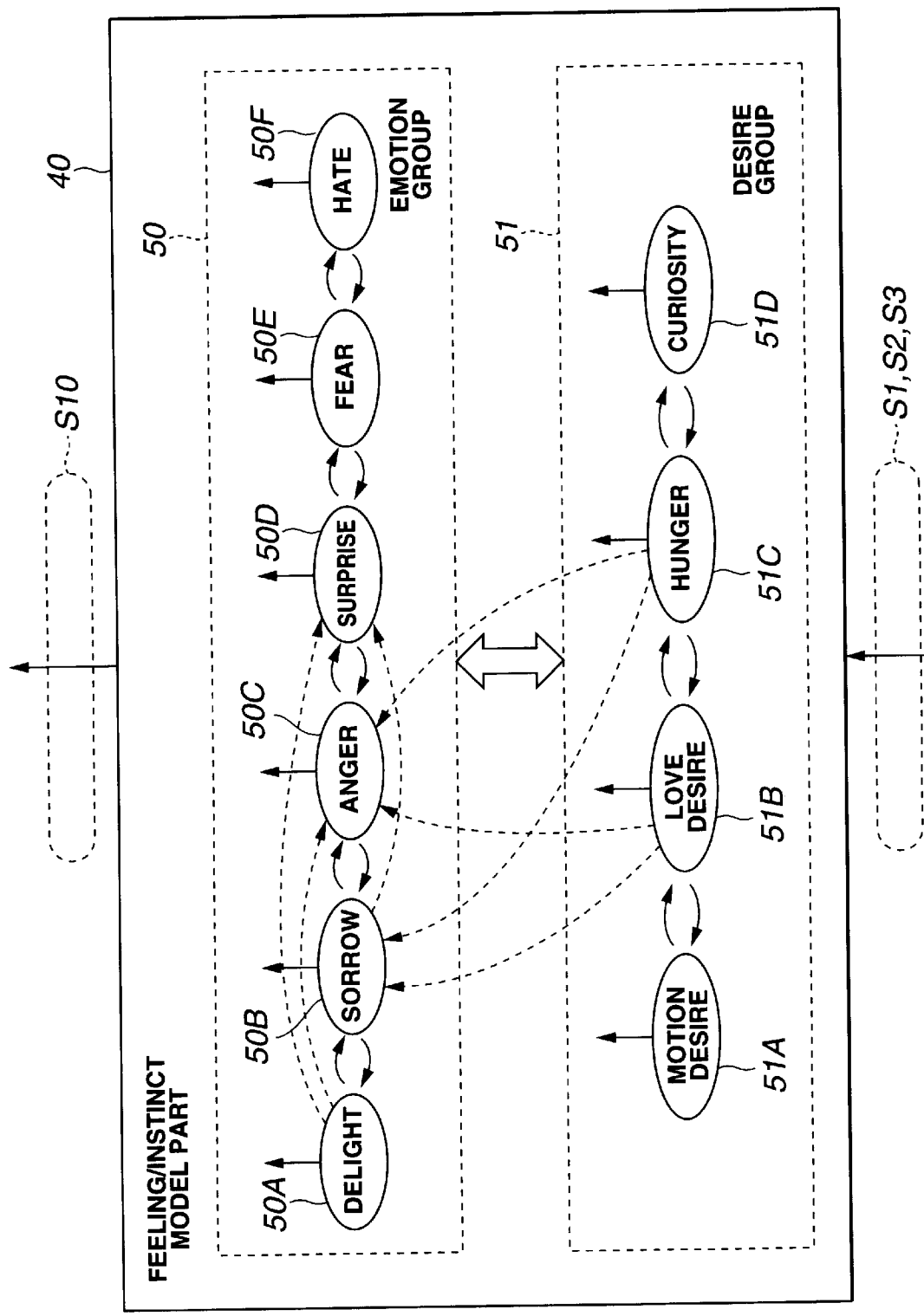
FIG. 4 is a schematic diagram showing data processing by a feeling/instinct model part.

As shown in FIG. 3, the contents of data processing performed by the controller 32 can be functionally sectioned into a feeling/instinct model part 40 as a feeling/instinct model change means, an action determination mechanism part 41 as an action determination means, a position transit mechanism part 42 as a position transit means, and a control mechanism part 43. The command signal S1, the external information signal S2, and internal information signal S3 supplied from the outside are inputted to the feeling/instinct model part 40 and the action determination mechanism part 41. The controller 32 schematically functions as follows.

The feeling/instinct model part 40 determines states of the feeling and instinct, based on the command signal S1, the external information signal S2, and the internal inforamtion signal S3. Further, the action determination mechanism part 41 determines next motion (action), based on feeling/instinct state information S10 obtained by the feeling/instinct model part 40 in addition to the command signal S1, the external information signal S2, and the internal information signal S3. The position transit mechanism part 42 in a rear stage prepares a position transit plan to transit to a next motion (action) determined by the action determination mechanism part 41. Note that the information concerning motion (action) determined by the action determination mechanism part 41 is fed back to the feeling/instinct model part 40, and the feeling/instinct model part 40 determines the states of the feeling and instinct, referring to the motion (action) determined. That is, the feeling/instinct model part 40 determines the instinct and feeling, referring also to a motion (action) result.

The control mechanism part 43 controls respective operation parts, based on position transit information S18 supplied from the position transit mechanism part 42 on the basis of the position transit plan. After the position is actually transited, a next motion (action) determined by the action determination mechanism part 41 is actually carried out.

That is, the robot apparatus 1 determines a next motion (action) based on the feeling/instinct by means of the above-described mechanisms of the controller 32, prepares a transit plan until the motion (action) is executed, lets the position transit based on the transit plan, and actually executes the motion (action) based on the feeling/instinct. In the following, the above-described respective structural parts of the controller 32 will be explained.

(3-1) Processing in Feeling/Instinct Model Part

The feeling/instinct model part 40 can roughly sectioned into an emotion group 50 which constructs a feeling model, and a desire group 51 which constructs an instinct model prepared as a model having a property different from the emotion model.

The feeling model is constructed by a feeling parameter of a certain value and is a model for expressing a feeling defined for the robot apparatus through a motion corresponding to the value of the feeling parameter. The value of the feeling parameter increases or decreases mainly based on an external input signal (external factor) which expresses "being hit" or "being scolded" and which is detected by a pressure sensor, a visual sensor, or the like. Of course, the feeling parameter changes based on an internal input signal such as a battery residue, a body temperature, or the like, in some cases.

The instinct model is constructed by an instinct parameter having a certain value and is a model for expressing an instinct (desire) defined for the robot apparatus, through a motion corresponding to the value of the instinct parameter. The value of the instinct parameter increases and decreases based on an internal input signal which expresses "a desire for exercise" based on its action history or "a desire for electric charge (hungry)" based on the battery residue. Of course, the instinct parameter may change based on an external input signal (external factor), like the feeling parameter.

Each of the feeling model and instinct model is constructed by plural types of models of an equal property. That is, the emotion group 50 includes emotion units 50A to 50F as independent feeling models having an equal property. The desire group 51 includes desire units 51A to 51D as independent instinct models having an equal property.

The emotion group 50 includes, for example, an emotion unit 50A indicating a feeling of "delight", an emotion unit 50B indicating a feeling of "sorrow", an emotion unit 50D expressing "surprise", an emotion unit 50E indicating a feeling of "fear", and an emotion unit 50F indicting a feeling of "hate". The desire group 51 includes, for example, a desire unit 51A indicating a desire of "movement instinct", a desire unit 51B indicating a desire of "love instinct", a desire unit 51C indicating a desire of "recharge instinct", and a desire unit 51D indicating a desire of "search instinct".

In each of the emotion units 50A to 50F, the level of the emotion is indicated by an intensity (emotion parameter) of 0 to 100 levels. The intensity of each emotion changes moment by moment, based on the command signal S1, the external information signal S2, and the internal information signal S3 supplied. Thus, the feeling/instinct model part 40 combines the intensities of the emotion units 50A with each other to express the state of the robot apparatus 1 thereby to model the time-based change of the emotion.

It is also arranged such that desired emotion units influence each other to change the intensities. For example, the emotion units are combined with each other such that the units restrain or stimulate each other thereby to change the intensities while influencing each other.

Figure 5:
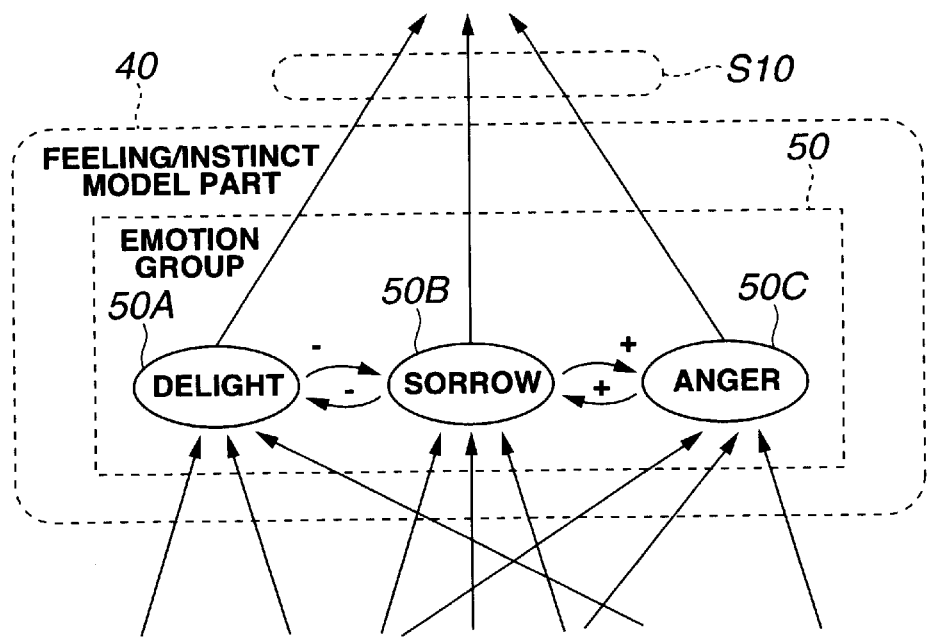
FIG. 5 is a schematic diagram showing data processing by the feeling/instinct model part.

Specifically, the emotion unit 50A for "delight" and the emotion 50B for "sorrow" can be combined so as to restrain mutually each other, as shown in FIG. 5. In this case, when the user praises the robot apparatus, the intensity of the emotion unit 50B for "delight" is increased, and the intensity of the emotion unit 50B for "sorrow" is decreased in accordance with the increase of the intensity of the emotion unit 50A for "delight" even if such input information S1 to S3 which will change the intensity of the emotion unit 50B for "sorrow" is not supplied. Similarly, when the intensity of the emotion unit 50B for "sorrow" increases, the intensity of the emotion unit 50A for "delight" is decreased.

In addition, the emotion unit 50B for "sorrow" and the emotion unit 50C for "angry" may be combined so as to stimulate each other. In this case, when the user hits the robot apparatus, the intensity of the emotion unit 50C for "angry" is increased, and the intensity of the emotion unit 50B for "sorrow" is increased in accordance with the increase of the intensity of the emotion unit 50C for "angry" even if such input inforamtion which will increase the intensity the intensity of the emotion unit 50B for "sorrow" is not supplied. Similarly, when the intensity of the emotion unit 50B for "sorrow" is increased, the intensity of the emotion unit 50C for "angy" is increased in accordance with the increase of the intensity of the emotion unit 50B for "sorrow".

Since desired emotion units thus influence each other thereby changing the intensities, the intensity of one of the combined emotion units changes as the intensity of another emotion unit is changed. A robot apparatus 1 which has a natural feeling can be realized.

In the desire units 51A to 51D, the levels of desires are expressed by intensities (instinct parameters) of 0 to 100 levels, like the emotion units 50A to 50F. Based on the supplied command signal S1 and external information signal S2, the intensities of the desires are changed moment by moment. Thus, by combining the intensities of the emotion units 51A to 51D which change moment by moment, the feeling/instinct model part 40 expresses the state of the instinct of the robot apparatus 1, and the time-based change of the instinct is modeled.

Further, like the case of combining emotion units with each other, desired desire units can influence each other thereby to change their intensities. For example, desired units can be combined so as to mutually restrain or mutually stimulate each other, so that the desired desire units influence each other thereby changing their intensities. In this manner, as the intensity of one of the desired desire units is changed, the intensity of another one of the combined desire units changes accordingly. It is thus possible to realize a robot apparatus 1 which has a natural instinct.

Further, the units can influence each other between the emotion group 50 and the desire group 51, so that their intensities can be changed. For example, changes of the intensities of the desire unit 51B for "love instinct" and the desire unit 51C for "recharge instinct" in the desire group 51 influence changes of the intensities of the emotion unit 50B for "sorrow" and the emotion unit 50C for "angry" in the emotion group 50. Or, a change of the intensity of the desire unit 51C for "recharge instinct" influences changes of the intensities of the emotion unit 50B for "sorrow" and the emotion unit 50C for "angry". In this manner, it is possible to express the states that the feelings of "angry" and "sorrow" are restrained when the "love instinct" is satisfied, and the feelings of "angry" and "sorrow" are intensified when the "recharge instinct" is not satisfied. Thus, mutual actions between the feelings and desires can express a state that feelings and instincts complicatedly influence each other.

As has been described above, the feeling/instinct model part 40 changes each of the intensities of the emotion units 50A to 50F and the desire units 51A to 51D by the input information S1 to S3 containing the command signal S1, the external information signal S2, and the internal information signal S3, or by a mutual action between the units in the emotion group 50 and/or between the units in the desire group 51, and/or by a mutual action between the units in the emotion group 50 and the units in the desire group 51.

Further, the feeling/instinct model part 40 determines the state of feeling by combining the intensities of the changed emotion units 50A to 50F, and also determines the state of instinct by combining the changed intensities of the desire units 51A to 51D. The part 40 further sends the determined states of the feeling and instinct, as feeling/instinct state information S10 to the action determination mechanism part 41.

Also, the feeling/instinct model part 40 is supplied with action information S12 which indicates the contents of current and past actions of the robot apparatus 1 from the action determination mechanism part 41. For example, if the action of walk is determined by the determination mechanism part 41, action information S12 is supplied as information which indicates that "it has walked for a long time".

By thus feeding back the action information S12, different feeling/instinct state information S10 can be generated in correspondence with actions of the robot apparatus 1 even if one same input information S1 to S3 is supplied. More specifically, the action information S12 to be fed back is referred to when determining the states of feeling and action, by the structure as follows.

Figure 6:
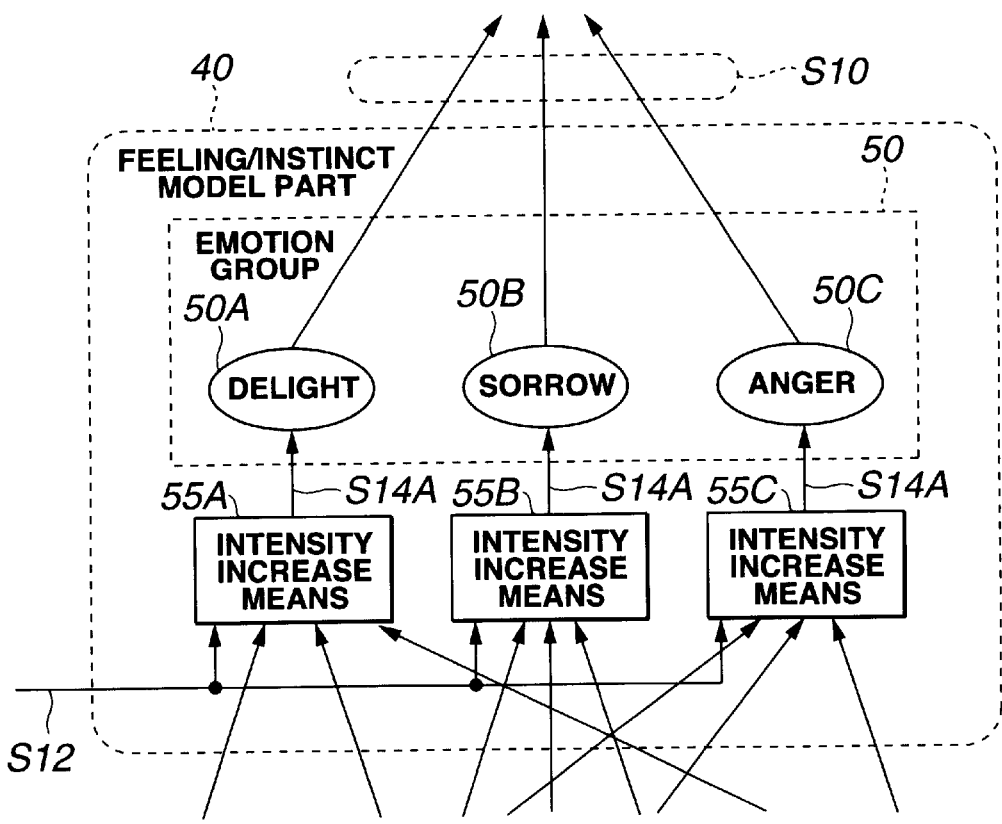
FIG. 6 is a schematic diagram showing data processing by the feeling/instinct model part.

As shown in FIG. 6, in the feeling/instinct model part 40, there are provided intensity increase/decrease means 55A to 55C for generating intensity information S14A to S14C for increasing/decreasing the intensity of the emotion units 50A to 50C, respectively, based on action information S12 indicating the action of the robot apparatus 1 and input information S1 to S3. The intensities of the emotion units 50A to 50C are respectively increased/decreased in accordance with the intensity information S14A to S14C outputted from the intensity increase/decrease means 55A to 55C.

For example, if the robot apparatus 1 is rubbed when it greets a user, the feeling/instinct model part 40 supplies the intensity increase/decrease means 55A with action information S12 indicating that it greeted the user and input information S1 to S3 indicating that it is rubbed by the user. Meanwhile, the feeling/instinct model part 40 does not change the intensity of the emotion unit 50A for "delight" even when the robot apparatus 1 is rubbed at its head during execution of any work, i.e., even if the intensity increase/decrease means 55A is supplied with action information S12 indicating that it is executing the work and input information S1 to S3 indicating that it is rubbed at its head. For example, the intensity increase/decrease means 55A is constructed in form of a function or table which will generate intensity information S14A to S14C based on the action information S12 and the input information S1 to S3. For example, this is the same with the other intensity increase/decrease means 55B and 55C.

Thus, the feeling/instinct model part 40 comprises the intensity increase means 55A to 55C. By determining the intensities of the emotion units 50A to 50C with reference to not only the input information S1 to S3 but also the action information S12 indicating the current or past action of the robot apparatus 1, it is possible to avoid generation of an unnatural feeling which will increase the intensity of the emotion unit 50A for "delight" when the user rubs the robot apparatus 1 as a mischief. The feeling/instinct model part 40 is arranged such that each of the intensities of the desire units 51A to 51C is increased/decreased, based on the input information S1 to S3 and the action information S12, like the case of the desire units 51A to 51C.

The present embodiment has been explained with reference to an example in which the emotion units 50A to 50C for "delight", "sorrow", and "angry" comprise the intensity increase/decrease means 55A to 55C. However, the present invention is not limited hitherto. Needless to say, the other emotion units 50D to 5OF for "surprise", "fear", and "hate" may comprise intensity increase/decrease means.

As has been described above, the intensity increase/decrease means 55A to 55C generate and output intensity information S14A to S14C in accordance with predetermined parameters, upon input of the input information S1 to S3 and the action information S12. Therefore, if different values are respectively set in different robot apparatuses 1, the robot apparatuses can have different personalities, e.g., a touchy robot apparatus, a cheerful robot apparatus, and the like can be provided.

(3-2) Processing in Action Determination Mechanism Part

The action determination mechanism part 41 is a section which determines a next motion (action) based on various information. Specifically, the action determination mechanism part 41 determines a next motion (action), based on the input information S14 containing the feeling/instinct state information S10 and the action information S12, and sends the contents of the determined motion (action), as the action command information S16, to the position transit mechanism part 42.

Figure 7:
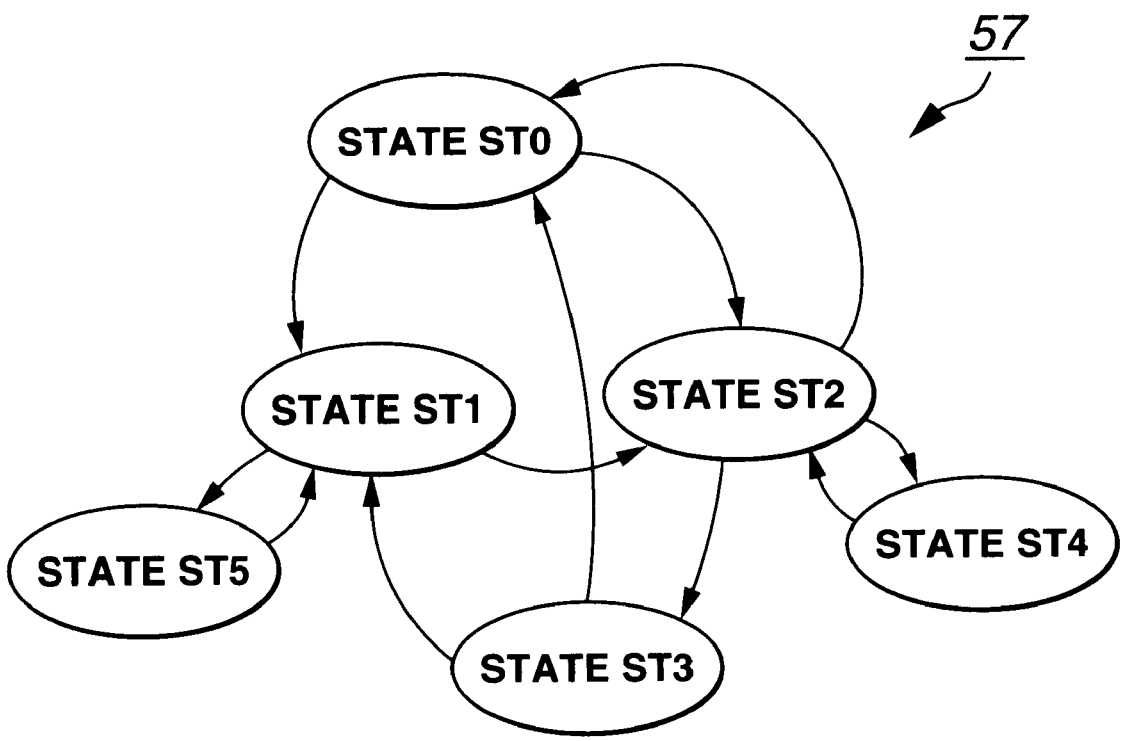
FIG. 7 is a view showing transit of states according to finite automation in an action determination mechanism part.

More specifically, as shown in FIG. 7, the action determination mechanism part 41 uses an algorithm called probability finite automation 57 having a finite number of states which will determine a next motion by expressing the history of the input information S14 supplied in the past, as operation states (hereinafter called states), and by letting a corresponding state transit to another state, based on currently supplied input information S14 and the state at this time.

Thus, the action determination mechanism part 41 lets the state transit every time when input information S14 is supplied. This part 41 determines an action in correspondence with the state to which the state has transited from a previous one. In this manner, the motion can be determined by referring to not only the current input information S14 but also the past input information S14.

As a result, for example, if input information S14 indicating that "the ball has been lost" is supplied in a state ST1 that "the robot apparatus 1 is chasing a ball", the state transits to a state ST5 indicating "standing". On the other hand, if input information S14 indicating "Stand up!" in a state ST2 that the robot is "sleeping", the state transits to a state ST4 indicating "standing". Accordingly, it is found that the states ST4 and ST5 are different from each other even though one same action is taken, because the history of the past input information S14 differs between these states.

In practice, the action determination mechanism part 41 lets the current state transit to a next state, when existence of a predetermined trigger is detected. A specific example of the trigger is a fact that the time for which the action of the current state is kept executed reaches a constant value, a fact that specific input information S14 is inputted, or a fact that among the intensities of the emotion units 50A to 50F and desire units 51A to 51D indicated by the feeling/instinct state information S10, the intensity of a desired unit exceeds a predetermined threshold value.

For example, the action determination mechanism part 41 selects the state of a transit destination, based on whether or not the intensity of a desired unit exceeds a predetermined threshold value, among the intensities of the emotion units 50A to 50F and desire units 51A to 51D indicated by the feeling/instinct state information S10 supplied from the feeling/instinct model part 40. IN this manner, for example, one same command signal S1 is inputted, the state can transit to different states in correspondence with the intensities of the emotion units 50A to 50F and desire units 51A to 51D.

Accordingly, the action determination mechanism part 41 generates action command information S16 for letting the robot apparatus itself "shake" in response to the palm of the hand set in front of the eyes and sends this information to the position transit mechanism part 42, if the action determination mechanism part 41 detects that the palm of a user's hand is set in front of the eyes of the robot apparatus, based on a supplied external information signal S2, that the intensity of the emotion unit 50C for "angry" is equal to or lower than a predetermined threshold value, based on the feeling/instinct state information S10, and that the robot apparatus is "not hungry", i.e., the battery voltage is equal to or higher than a predetermined threshold value.

Accordingly, the action determination mechanism part 41 generates action command information S16 for letting the robot apparatus 1 "lick the palm of the hand", if the action determination mechanism part 41 detects that the palm of a user's hand is set in front of eyes, the intensity of the emotion unit 50C for "angry" is equal to or lower than a predetermined threshold value, and the robot apparatus is "hungry (recharge is needed)", i.e., the battery voltage is lower than a predetermined threshold value.

If the action determination mechanism part 41 detects that the palm is set in front of the eyes and that the intensity of the emotion unit 50C for "angry" is equal to or higher than a predetermined threshold value, the action determination mechanism part 41 generates action command information S16 for letting the robot apparatus 1 act like it "looks away" and sends it to the position transit mechanism part 42, regardless of whether or not the robot apparatus is not "hungry", i.e., regardless of whether or not the battery voltage is equal to or higher than a predetermined threshold value.

As described above, the action determination mechanism part 41 determines a next action, based on the input information S14. For example, this part 41 holds a plurality of contents of actions to be determined, e.g., "action 1", "action 2", "action 3", "action 4", . . . "action n". For example, the "action 1" contains a motion content for an action of kicking a ball. The "action 2" contains a motion content for an action of expressing a feeling. The "action 3" contains a motion content for an action of autonomous search. The "action 4" contains a motion content for an action of avoiding an obstacle. The "action n" contains a motion content for an action of notifying a small residue of battery.

From the plurality of information items thus prepared, a selection is made in accordance with the probability finite automation 57, based on the input information S14. A next action is thereby determined.

Figure 8:
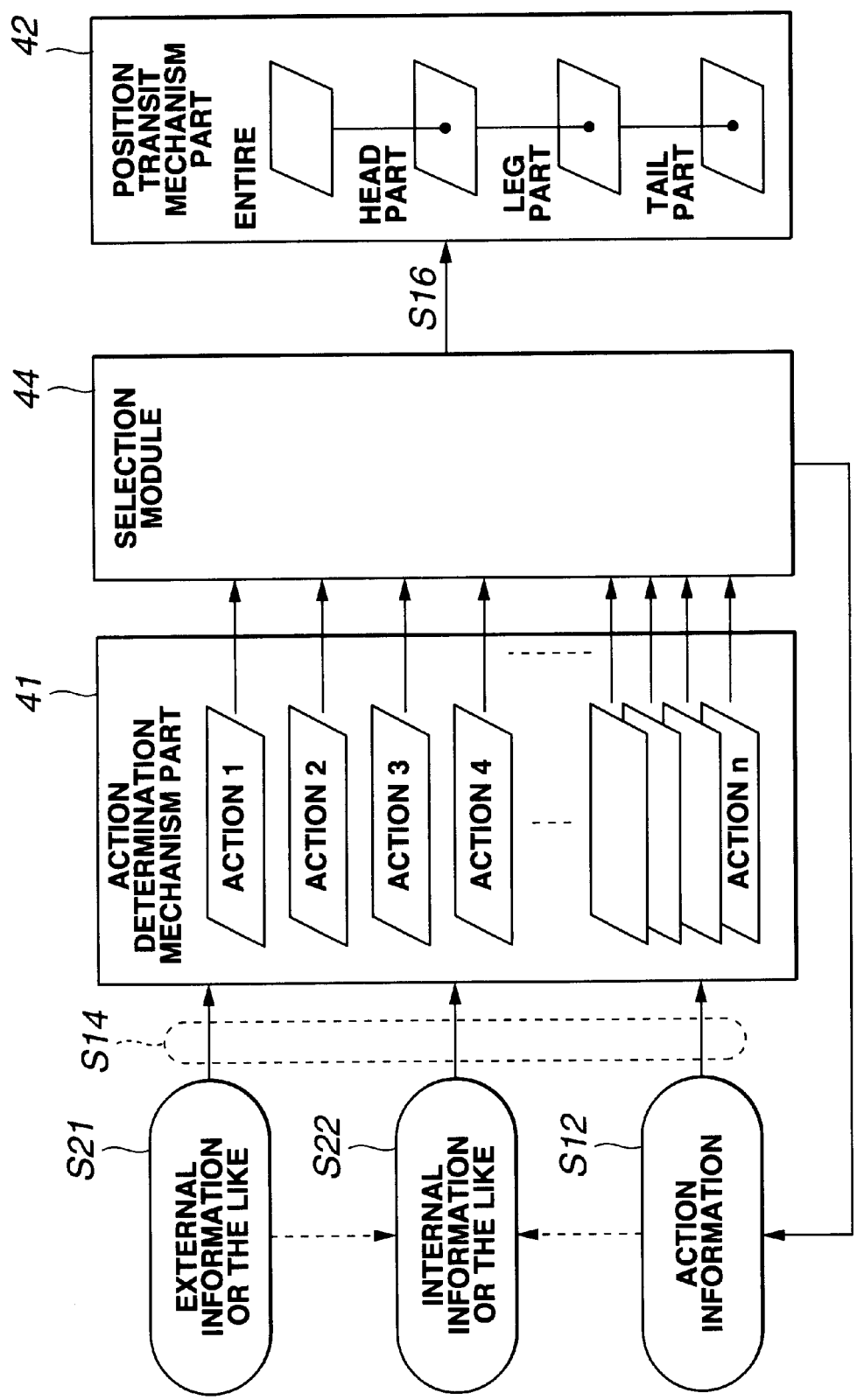
FIG. 8 is a block diagram showing a structure of an action determination mechanism part and the like which are used for explaining generation of action command information.

The selection (determination) of an action is practically carried out by a selection module 44 as shown in FIG. 8. The selection module 44 outputs the selection result as action command information S16 to the position transit mechanism part 42, and as action information S12 to the feeling/instinct model part 40 and the action determination mechanism part 41. For example,the selection module 44 stands a flag on a determined action, and outputs the information thereof as action information S12 and action command information to the action determination mechanism part 41 and the position transit mechanism part 42.

The action determination mechanism part 41 determines an action, based on the action information S12 in addition to the external information S21 (the command signal S1 and external signal S2) or the like and the internal information S22 (the internal information signal S3 and the feeling/instinct state information S10) or the like. In this manner, a next action can be determined in consideration of a previous action.

In addition, the feeling/instinct model part 40 changes the states of the feeling and instinct, based on equal input information S1 to S3, as described above. As a result of this, the feeling/instinct model part 40 can generate different feeling/instinct state information S10 even if equal input information S1 to S3 is supplied, as described above.

A group ID can be appended to the information indicating the motion contents of the "action 1", "action 2", "action 3", "action 4", . . . "action n". The group ID expresses equal information common to one same category. For example, in case where a plurality of patterns of actions are included in the action of "kick a ball", one same group ID is added to each of the plurality of actions. By thus appending one same group ID to each of actions in one same category, the actions in the one same category can be processed as a group.

For example, when an action is selected by the selection module 44, one same group ID is issued to any action selected from one same category. Then, the group ID appended to the selected action is sent to the feeling/instinct model part 40, so that the feeling/instinct model part 40 can determine the states of the feeling and instinct.

In addition, the action determination mechanism part 41 determines parameters of an action to be executed in the state as a transit destination, such as the speed of walking, magnitudes of motions when hands and legs are moved, the pitch of a tone when a tone is generated, and the like, based on the intensity of a desired unit among the intensities of the emotion units 50A to 50F and desire units 51A to 51D indicated by the feeling/instinct state information S10 supplied from the feeling/instinct model part 40. IN this manner, for example, one same command signal S1 is inputted, the state can transit to different states in correspondence with the intensities of the emotion units 50A to 50F and desire units 51A to 51D. The part 41 then generates action command information S16 and sends it to the position transit mechanism part 42.

As for the input information S1 to S3 comprised of the command signal S1, external information signal S2, and internal information signal S3, the contents of information differ in correspondence with the timing at which the information is inputted to the feeling/instinct model part 40 and the action determination mechanism part 41. Therefore, the input information S1 to S3 is inputted also to the action determination mechanism part 41 together with the feeling/instinct model part 40.

For example, when the controller 32 is supplied with an external information signal S2 indicating that the "head is rubbed", the controller 32 generates feeling/instinct state information S10 indicating "delight" by means of the feeling/instinct model part 40, and supplies it to the feeling/instinct state information S10 to the action determination mechanism part 41. However, when an external information signal S2 indicating "a hand exists in front of eyes" is supplied in this state, the action determination mechanism part 41 generates action command information S16 of "willing to shake", based on the feeling/instinct state information S10 indicating "delight" and the external information signal S2 indicating that "a hand exists in front of eyes". The part 41 sends it to the position transit mechanism part 42.

Figure 9:
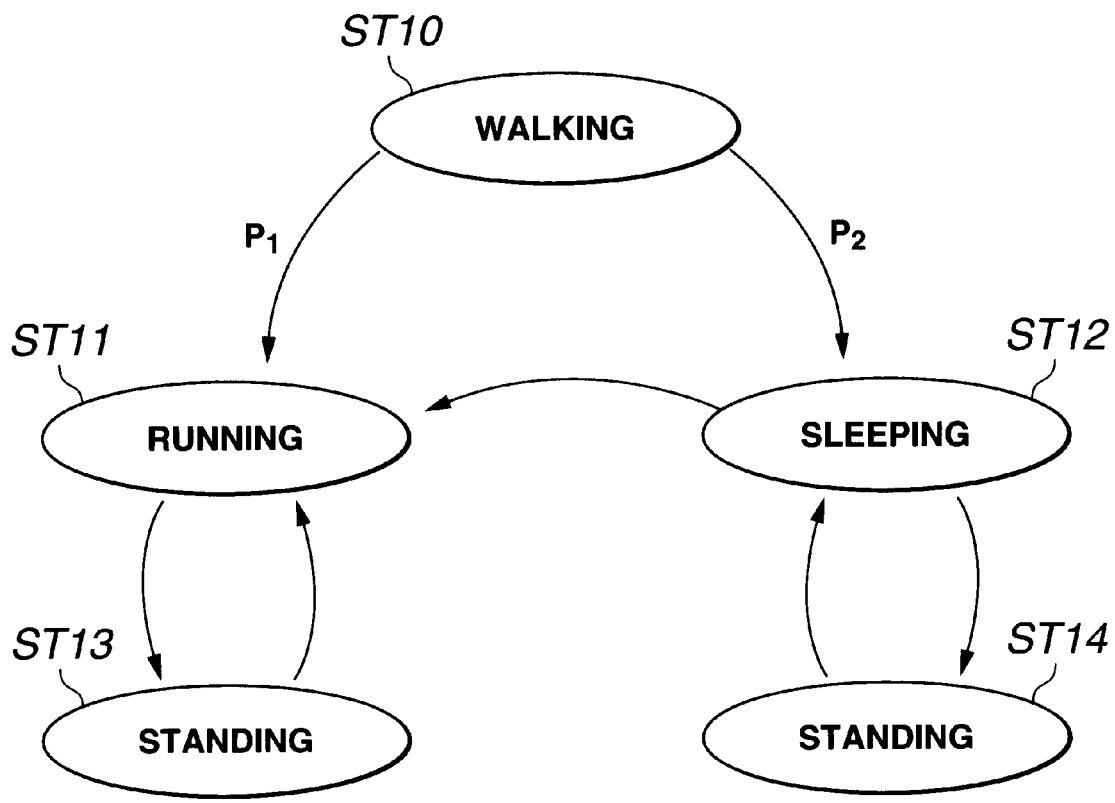
FIG. 9 is a view used for explaining a case where a state is determined by probability.

In addition, the transit destination of the motion state (or node) can be determined by a certain probability by the probability finite automation 57. For example, when there is an input from the outside, the motion state transits to a certain motion state (action state) at a probability of 20% (transit probability). In practice, in case where transition is possible from the state ST10 of "walking" to the state ST11 of "running" or the state ST12 of "sleeping" as shown in FIG. 9, the transit probability of transition to the state ST11 of "running" is set to P1 and the transit probability of transition to the state ST12 of "sleeping" is set to P2. The transit destination is determined those probabilities. Note that a technique of determining a transit destination by probability is disclosed in the Japanese Patent Application KOKAI Publication No. 9-114514.

Figure 10:
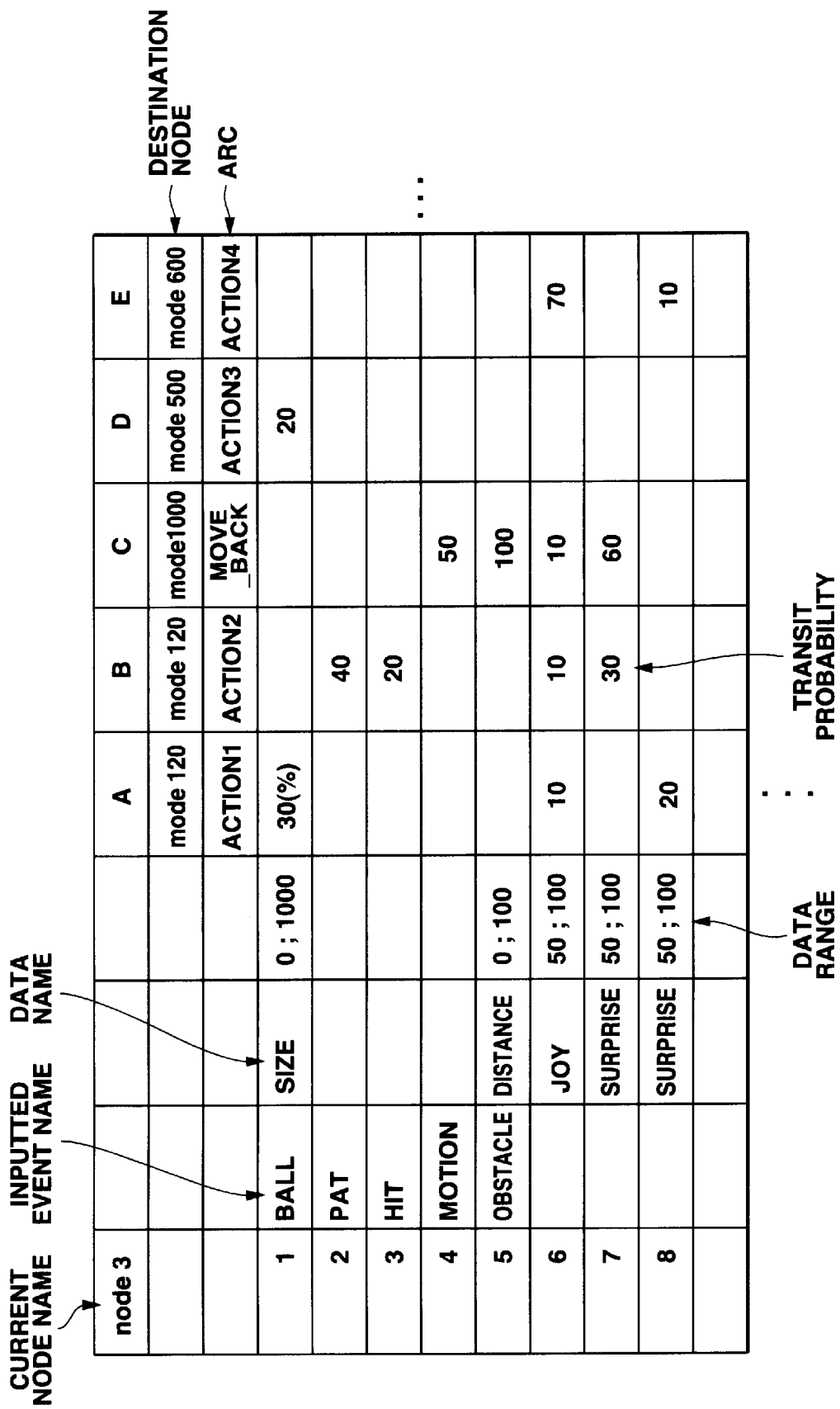
FIG. 10 shows a table in which relationships between transit probabilities and states to which the positions transit.

Also, the robot apparatus 1 holds information concerning the probability of transition to a state, in form of a table. An example of the table is shown in FIG. 10. The table shown in FIG. 10 is constructed by node names, inputted event names, data names of inputted event, ranges of data of inputted events, and information concerning transit probabilities of transitions to states.

From this kind of table, the transit probability of transition to a certain state is determined in correspondence with an inputted event, and the state of the transit destination is determined on the basis of the transit probability.

The node name which indicates a current action state indicates an action state (or state simply) of the robot apparatus 1, i.e., it indicates what action is being executed now.

Also, the inputted event is information inputted to the robot apparatus 1, and the table is classified with use of these inputted events. For example, the "BALL" of the inputted event name means that the inputted event indicates detection of a ball. "PAT" means being patted. "HIT" means being hit. "MOTION" means detection of a moving ball, and "OBSTACLE" means detection of an obstacle.

In addition, the table is set up with use of a large number of inputted events. The present embodiment will be explained with reference to the case where "BALL", "PAT", "HIT", "MOTION", and "OBSTACLE".

The data range of inputted events means the range of data in case where such an inputted event requires a parameter, and the data name of the inputted event means such a parameter name. That is, if an inputted event is "BALL", the data name means "S1ZE" which is the size of the ball, and the range of data means that the range of such a size is 0 to 1000. Similarly, if an inputted event is "OBSTACLE", the data name means the distance "DISTANCE" thereof. The data range means that the range of such a distance is 0 to 100.

Further, a transit probability of transition to a state is assigned to each of a plurality of states which can be selected in accordance with the characteristic of an inputted event. That is, transit probabilities are assigned respectively to arcs such that the total of the transit probabilities assigned to states which are selectable with respect to an inputted event. More specifically, in case of the inputted event of "BALL", the total of transit probabilities 30%, 20%, . . . assigned to "ACTION 1", "ACTION 3" that can be selected in accordance with the characteristic of this inputted event is arranged to become 100%.

Note that the "node" and "arc" described herein are generally defined by so-called probability finite automation. "Node" is defined as a state (called an action state in the present embodiment). "Arc" is defined as an oriented line (called a transit motion in the present embodiment) which connects the "arc" and "node" with a certain probability.

From the table constructed by information as described above, an inputted event, the range of data obtained by the inputted event, and the transit probability are referred to, and the state as a transition destination is selected in the manner described below.

For example, in case where the robot apparatus 1 detects a ball (i.e., in case where an inputted event is "BALL"), a node 3 as a current state transits to a node 120 at a probability of 30% when the size of the ball is 0 to 1000. In this transition, the arc assigned to the "ACTION 1" is selected, and a motion or expression corresponding to "ACTION 1" is executed. Or, the node 3 as a current state transits to the node 500 at a probability of 20%. In this transition, the arc to which "ACTION 3" is assigned is selected, and a motion or expression corresponding to "ACTION 3" is carried out. "ACTION 1" and "ACTION 3" may be, for example, "bark" and "kick" or so. Meanwhile, when the size of the ball is 1000 or more, "node 120" and "node 500" are selected with no probability.

Also, in case where the robot apparatus 1 finds an obstacle (in case where an inputted event is "OBSTACLE"), the node of "node 1000" as a moving-back action is selected at a probability of 100% when the distance therefrom to the obstacle is 0 to 100. That is, the arc appended with "MOVE_BACK" at a probability of 100%, and the "MOVE_BACK" is executed.

As described above, a state (node) or arc can be selected, or an action model can be determined with use of a table or the like. Thus, it is possible to prevent one same transit determination from being always selected, by determining the state of a transit destination in consideration of a probability. That is, expression of the action of the robot apparatus 1 can be enriched.

In addition, selection of a state described above and determination of an action model can also be made on the basis of the state of an emotion model. For example, an action mode can be determined by changing the transit probability of transition between states described above on the basis of the state of the emotion model.

For example, determination of transition to a state as described above is utilized. That is, the state of the emotion model (e.g., the level thereof) is referred to, and the transit probability is changed in accordance with the state of the emotion model. In this manner, determination of an action model is made on the basis of the emotion model. As a result, the action model is influenced by the state of the emotion model. This will be explained with user of the table shown in FIG. 10.

For example, "JOY", "SURPRISE", and "SADNESS" are prepared as data which determines the transit probability. The "JOY", "SURPRISE", and "SADNESS" correspond to emotion units 50A, 50D, and 50B of the emotion model. Further, the range of data is set to 0 to 50, for example. This data range corresponds to the level of the emotion unit described above.

In this manner, when "JOY", "SURPRISE", and "SADNESS" are at predetermined levels, e.g., 0 to 50 in the case of the present embodiment, a predetermined transit probability of transition to a predetermined state is determined. For example, if "JOY" whose data range is 0 to 50 has an actual level of 30, arcs assigned with "ACTION 1", "ACTION 2", "MOVE_BACK", "ACTION 4" are selected respectively at probabilities of 10%, 10%, 10%, and 70%, and the state transits to a predetermined states.

As shown in FIG. 10, the transit probability can be determined even in a state where no input is supplied from the outside by referring to "JOY", "SURPRISE", and "SADNESS" regardless of inputted events, i.e., by referring to them in a so-called empty event state. In this manner, for example, the emotion model can be referred to for determination of the transition probability when no inputted event is detected for a predetermined time.

Further, in this case, the actual levels of "JOY", "SURPRISE", and "SADNESS" can be referred to by referring to "JOY", "SURPRISE", and "SADNESS" in his order. In this manner, for example, when the actual level of "SADNESS" is 60, the data range is set to 0 to 50 so that the actual level of the next "JOY" is referred to. Further, in case where "JOY" whose data range is 0 to 50 has an actual level 20, the arc to which "ACTION 2" is assigned is selected at a probability of 30% and the arc to which "MOVE_BACK" is assigned is selected at a probability of 60%, so that the state transits to a predetermined state.

As described above, the present embodiment is arranged such that the action model can be determined on the basis of the state of the feeling model. Thus, the action model is influenced by the state of the feeling model thereby enriching expressions of the robot apparatus 1.

By various means as described above, the action command information S16 is determined by the action determination mechanism part 41.

(3-3) Processing in Position Transit Mechanism Part

The position transit mechanism part 42 is a part which generates information for transiting to an aimed position or aimed motion. Specifically, the position transit mechanism part 42 generates position transit information S18 for letting the current position or motion to a next position or motion (an aimed position or motion), based on the action command information S16 supplied from the action determination mechanism part 41, as shown in FIG. 3. The part 42 then sends the information to the control mechanism part 43. For example, the position to which the current position can transit is determined by the physical shape of the robot apparatus 1, such as the shapes of the trunk, hands, and legs, the size, and the connecting states of respective parts, and the mechanisms of the actuators 23A to 23N, such as directions and angles in and at which joints bend. The position transit information S18 is prepared as information for executing transition, taking into consideration the above.

The control mechanism part 43 actually moves the robot apparatus 1 based on the position transit information S18 thus sent from the position transit mechanism part 42.

The position transit mechanism part 42 previously registers positions to which the robot apparatus 1 can transit and motions to be taken when it transits. For example, the positions and motions are maintained in form of a graph, and the part 42 sends action command information S16 supplied from the action determination mechanism part 41, as position transit information S18, to the control mechanism part 43. The control mechanism part 43 operates in accordance with the position transit information S18 and lets the robot apparatus transit to an aimed position or an aimed motion. In the following, processing to be executed by the position transit mechanism part 42 will be explained specifically.

For example, the robot apparatus 1 cannot directly transit to a position according to the contents of a command (action command information S16) in some cases. This is because the positions of the robot apparatus 1 are classified into the type of positions to which the robot apparatus 1 can transit directly from the current position, and the type of positions to which it cannot transit directly from the current position but can transit through a certain motion or position.

For example, the quadruped robot apparatus 1 can directly transit from a position in which the robot apparatus 1 lies down stretching out widely hands and legs to a position in which it keeps itself down but cannot directly transit to a standing position. Therefore, the robot apparatus 1 needs motions in two stages, i.e., the robot apparatus 1 must once contract its hands and legs close to the trunk and then stands up. In addition, there is a position which cannot be executed safely. For example, when the quadruped robot apparatus 1 is going to raise both front legs to give a hail in a standing position, it stumbles. Or, when "thrashing its legs" which can be carried out only in the sitting position is sent as a content of a command, the current position is a lie-down position (sleeping position), transition from the sleeping position to the sitting position and motion of thrashing legs are executed if the command is issued directly. Therefore, the robot apparatus 1 loses its balance and stumbles over.

Therefore, if the action command information S16 supplied from the action determination mechanism part 41 indicates a position to which the robot apparatus 1 can directly transit, the position transit mechanism part 42 directly sends the action command information S16 as the position transit information S18 to the control mechanism part 43. Otherwise, if the action command information S16 indicates a position to which the robot apparatus 1 cannot directly transit, the position transit mechanism part 42 generates position transit information S18 which lets the robot apparatus 1 transit to an aimed position (action command information S16 indicated by the action command information S16) through another position or motion to which the robot apparatus can transit. The part 42 then sends it to the control mechanism part 43. In this manner, the robot apparatus 1 can avoid a situation that a position to which the robot apparatus cannot transit is forcedly carried out or stumble. Or, preparation of a plurality of actions to be executed until an aimed position or motion is achieved can be connected to enrichment of expressions.

Specifically, the position transit mechanism part 42 holds a graph that registers positions and motions, which the robot apparatus 1 can take, and that is constructed by connecting a position and a motion for letting this position transit. The position transit mechanism part 42 searches a route from the current position to an aimed position or an aimed motion, on the graph, based on the action command information S16 as command information, and lets the robot apparatus 1 move on the basis of the search result, thereby to let the robot apparatus transit from the current position to an aimed position or motion. That is, the position transit mechanism part 42 previously registers a position which the robot apparatus 1 can take and records routes through which the robot apparatus can transit between two positions. Based on this graph and the action command information S16 outputted from the action determination mechanism part 41, the robot apparatus 1 is let transit to an aimed position or motion.

Figure 11:
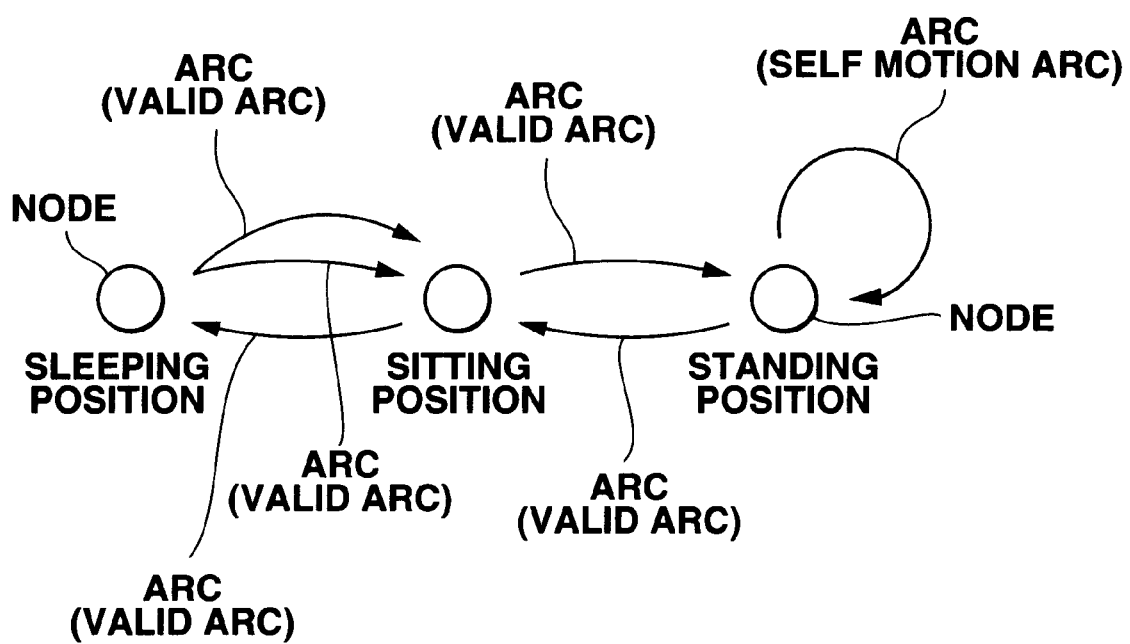
FIG. 11 shows a graph of position transit in the position transit mechanism part.

Specifically, the position transit mechanism part 42 uses an algorithm called an oriented graph 60 as shown in FIG. 11, as a graph described above. The oriented graph 60 is constructed by nodes indicating positions which the robot apparatus 1 can take, oriented arcs (motion arc) each connecting two positions (nodes) between which the robot apparatus can transit, and, in some cases, arcs of motions each expressing return from a node to itself, i.e., a self-motion arc expressing a motion completed within one node. The nodes and arcs are connected to each other. That is, the position transit mechanism part 42 maintains an oriented graph 60 which is constructed by nodes as information indicating positions of the robot apparatus 1, and oriented arcs and self-motion arcs as information indicating motions of the robot apparatus 1. In addition, the part 42 grasps positions as information of points, and further, information of motions as information of oriented lines.

The oriented arcs and self-motion arcs may be plural. That is, a plurality of oriented arcs may be connected between nodes (positions) between which the robot apparatus can transit, and one node may be connected to a plurality of self-motion arcs.

When action command information S16 is supplied from the action determination mechanism part 41, the position transit mechanism part 42 searches a route from the current node to a next node, following the direction of an oriented arc a, such that a node corresponding to a current position and a position to be taken next, which is indicated by the action command information S16, and records nodes on the searched route in order, thereby to prepare a plan of position transition. In the following, search for a route to an aimed node (the node indicated by a command) from the current position is called a route search. The aimed arc described herein may be an oriented arc or a self-motion arc. For example, the case where the self-motion arc is an aimed arc is a case where the self-motion is aimed (commanded), e.g., a case where a predetermined trick (motion) is instructed, or the like.

The position transit mechanism part 42 outputs a control command (position transit information S18) to the control mechanism part 43 in the rear stage, based on a position transit plan until an aimed position (node) or motion (oriented arc or self-motion arc) is attained.

Figure 12:
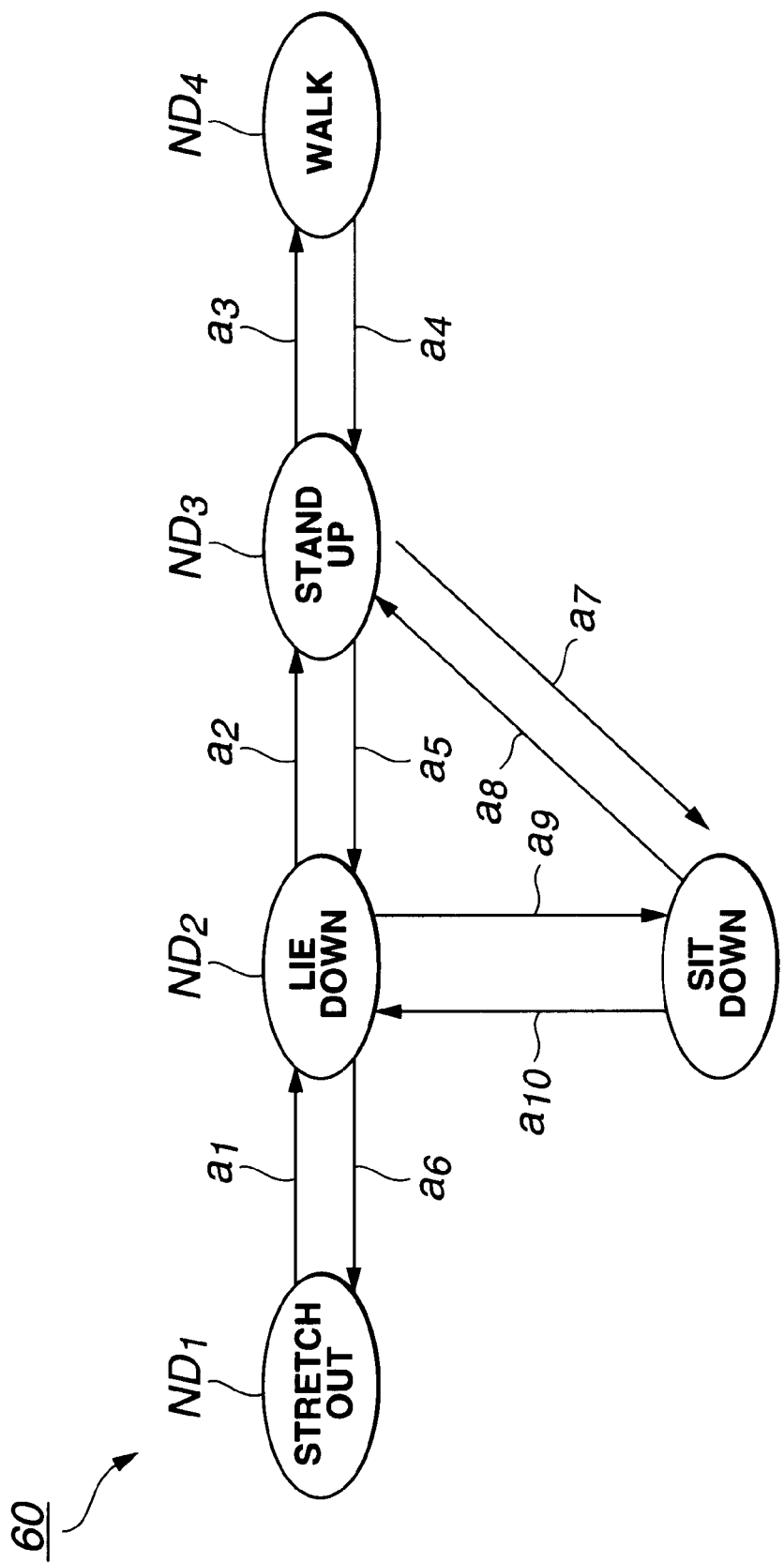
FIG. 12 shows a specific example of a graph of position transit.

For example, as shown in FIG. 12, when action command information S16 of "Sit down!" is supplied in case where the current position is at a node $ND_2$ indicating a position of "being down", an oriented arc $a_9$ exists from a node $ND_2$ indicating the position of "being down" to a node $ND_5$ indicating the position of "sitting", so direct transition can be achieved. As a result, the position transit mechanism part 42 supplies position transit information S18 indicating a content of "Sit down!" to the control mechanism part 43.

When action command information S16 of "Walk!" is supplied in case where the current position is at a node $ND_2$ indicating the position of "being down", direct transition from "being down" to "walk" cannot be achieved, so that the position transit mechanism part 42 searches a route from a node $ND_2$ indicating the position of "being down" to a node $ND_4$ indicating the position of "walking", thereby to prepare a position transit plan. That is, a position plan is prepared such that a node $ND_3$ indicating the position of "standing" is selected through the oriented arc $a_2$ from the node $ND_2$ indicating the position of being down, and the position further reaches a node $ND_4$ through an oriented arc $a_3$ from the node $ND_3$ indicating the position of "standing". As a result of this position transit plan, the position transit mechanism part 42 issues position transit information S18 having a content of "Stand up!", and thereafter outputs position transit information S18 having a content of "Walk!" to the control mechanism part 43.

As for pasting of a self-motion arc to each node in case where a graph is constructed by nodes as shown in FIG. 12, a self-motion arc indicating a motion of "dance" is pasted on a node $ND_3$ indicating a position indicating the position of "standing". Or, a self-motion arc indicating a motion of "hail" is pasted on a node $ND_5$ indicating the position of "sitting", or a self-motion arc indicating a motion of "snore" is pasted on a node $ND_1$ indicating the position of "stretch out".

The robot apparatus 1 is constructed so as to normally grasp what position the robot apparatus 1 is in. However, the robot apparatus 1 loses its current position in some cases. For example, the robot apparatus 1 cannot grasp its current position when it is lifted up by a user, when it stumbles over, or when the power is started. For example, the current position which thus cannot be grasped is called an indefinite position. If the current position thus cannot be grasped and is determined to be an indefinite position, a so-called start position cannot be determined, so that a position transit plan until an aimed position or motion cannot be prepared.

Figure 13:
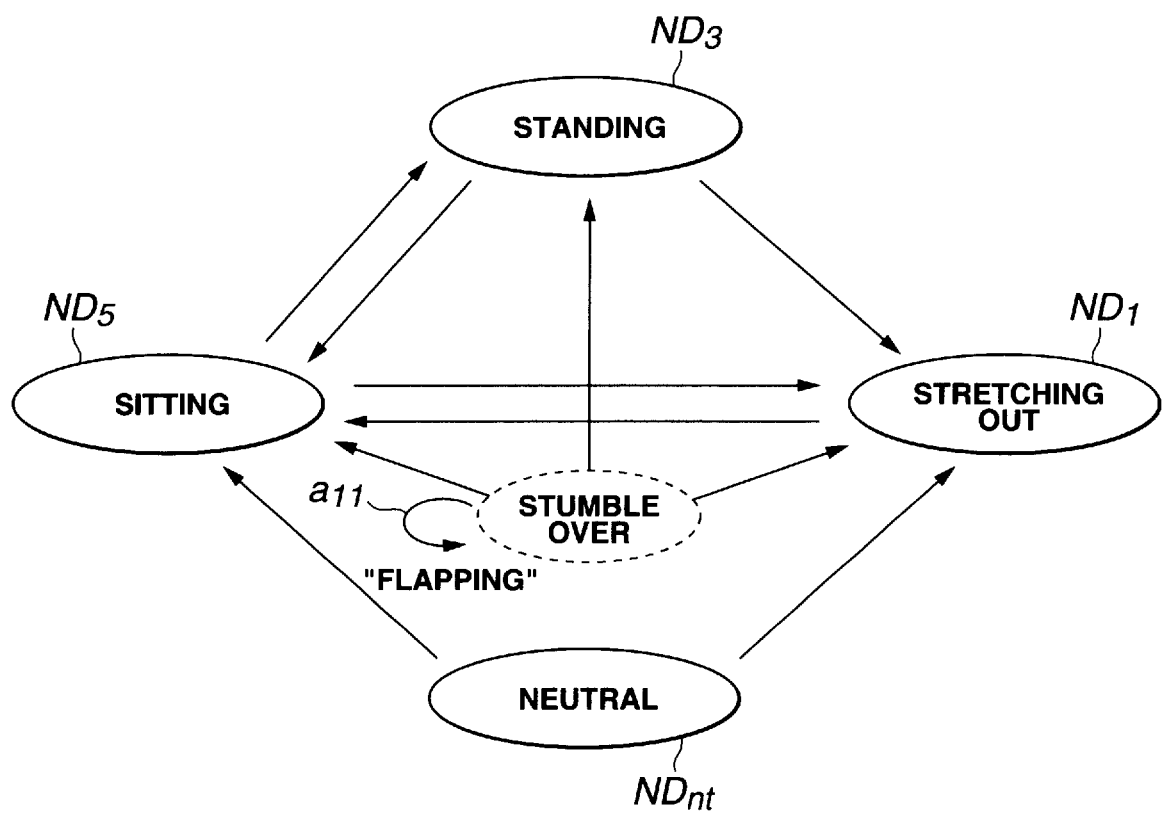
FIG. 13 is a view showing transit of states used for explaining that a neutral position to which the current position is let transit if the current position cannot be grasped is comprised and-that recovery from stumble-over is enabled.

Hence, a node indicating a neutral position is provided. If the current position is indefinite, the robot apparatus is let transit to a neutral position, and a position transit plan is then prepared. For example, when the current position is indefinite, the neutral position is let transit to the node $ND_{nt}$, as shown in FIG. 13, and this position is then let transit to a node indicating a basic position such as a node $ND_3$ indicating the position of "standing", the node $ND_5$ indicating the position of "sitting", or the node $ND_1$ indicating the position of "lying down". Further, after the transition to this basic position, a position transit plan is prepared as an original problem.

The present embodiment has been explained with the "standing", "sitting", and "lying down" positions cited as basic positions to which the neutral position transits. Needless to say, the present embodiment is not limited hitherto but another position may be taken as a basic position.

With respect to transition from an indefinite position to the neutral position (node), an operating part (e.g., an actuator) is driven at a low torque or a low speed, for example. In this manner, the load to the servo is reduced. Therefore, the operating part can further be prevented from being driven like in normal operation and from being damaged thereby, for example. For example, the tail part 5 normally moves as if it swung. However, if this motion of the tail part 5 is carried out when the position transits to the neutral position (node), the tail part 5 may be damaged if the robot apparatus 1 lies down in an indefinite position.

Also, the robot apparatus 1 can grasp a stumble of itself and can transit from a stumble position to a node indicating a basic position as described above. For example, the robot apparatus 1 is provided with an acceleration sensor and detects stumbling of itself.

Specifically, when the robot apparatus 1 detects that it has stumbled by means of an acceleration sensor, the robot apparatus 1 makes a predetermined motion for recovery from the stumble and thereafter transits to a node indicating a basic position as described above.

The robot apparatus 1 is also arranged so that it grasps the stumbling direction. More specifically, the robot apparatus 1 can grasp its stumbling direction in both of the frontward, backward, leftward, and rightward directions. In this manner, the robot apparatus 1 can make a motion for recovery from a stumble in correspondence with the stumbling direction. Accordingly, the robot apparatus can rapidly transit to a basic position.

When a stumble is detected, a predetermined expression may be outputted. For example, the robot apparatus thrushes its legs according to a self-motion arc $a_{11}$, as a predetermined expression. In this manner, it is possible to express a situation that the robot apparatus 1 has stumbled over and struggles.

Further, if a plurality of oriented arcs not shown exist between a node $ND_2$ of "lying down" and a node $ND_3$ of "standing", a position transit plan of transiting to the node $ND_3$ of "standing" can be prepared by selecting an optimal oriented arc.

As described above, there are cases that a plurality of oriented arcs exist between nodes and that a plurality of nodes are connected to one node through oriented arcs. Therefore, there are a plurality of routes that connect an aimed node or arc (oriented arc or a self-motion arc) from a current node.

From the above, a position transit plan is prepared in order to take an index of shortening the distance between a current node and an aimed node, as an index, i.e., by means of a so-called shortest distance search for a route which provides the shortest distance.

Figure 14:
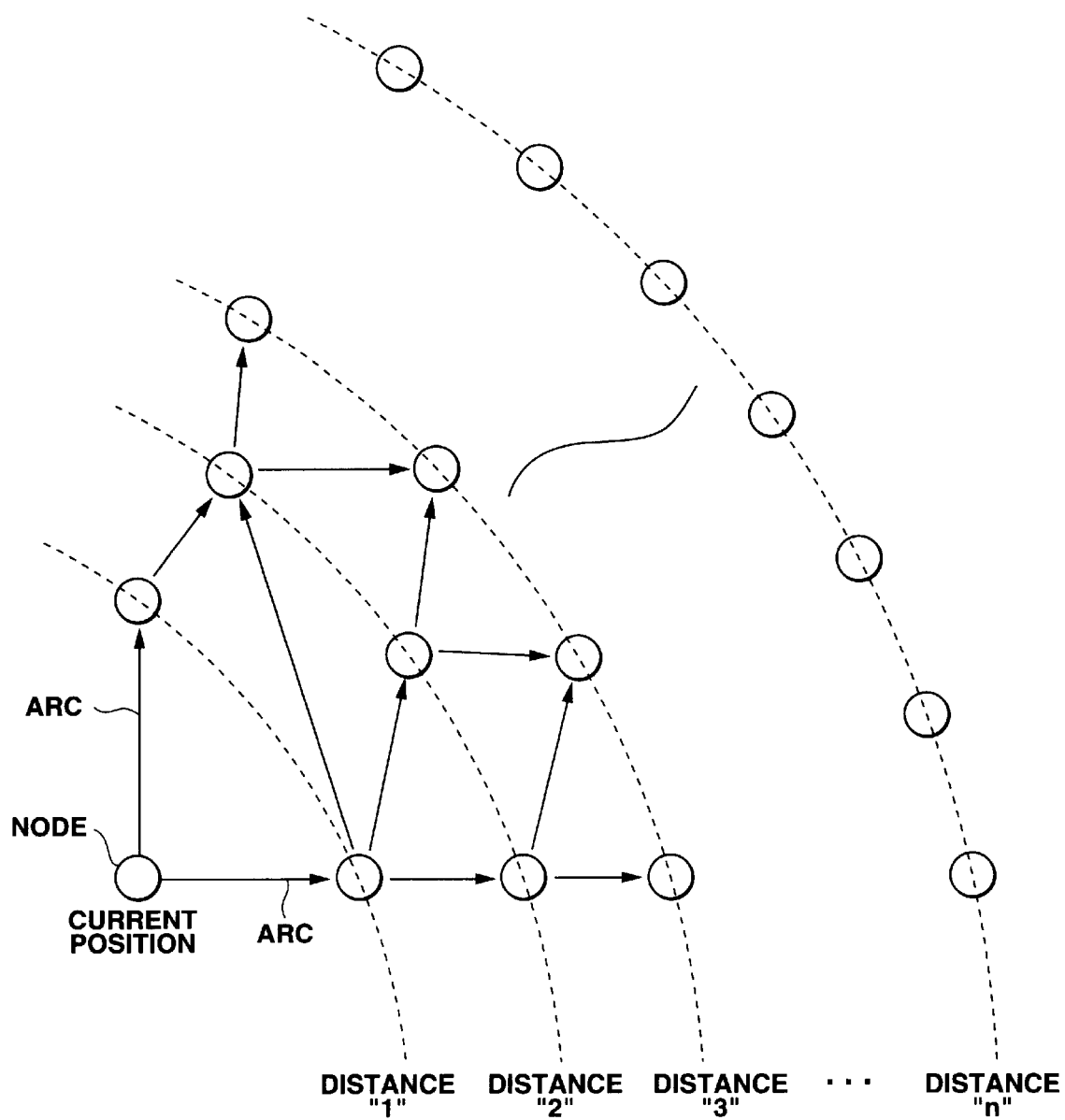
FIG. 14 is a view used for explaining a route search with the distance used as an index.

As shown in FIG. 14, the shortest distance search is carried out using the concept of distance for an oriented arc (arrow mark) connecting nodes (circle mark). A route search method of this kind is a path search logic of DAIKISU-TORA (phonetic translation). The distance can be substituted by a concept of weighting, time, or the like as described later. FIG. 14 shows a result of connecting nodes to which the current position can transit through an oriented arc having a distance of "1".

Therefore, it is possible to select the shortest route from the current position (node) to an aimed node by using this kind of distance as an index of a route search.

More specifically, suppose a case that four routes exist from the current node to an aimed node wherein the first to fourth routes respective have distances of "12", "10", "15", and "18". The node transits through the second route having the distance of "10", and a position transit plan until an aimed position is prepared.

The method of searching the shortest distance is not limited to the method of this kind.

In the above example, a plurality of routes are searched, and the route having the shortest distance to an aimed node is selected from the search result. In other words, routes through which the current node can transit to an aimed node are searched as many as possible to attain a plurality of routes. From the plurality of routes, the shortest route is specified with the distance used as an index. However, search for a route having the shortest distance is not limited to search for the shortest route by means of this method but the processing of route search can be terminated at the time point when the shortest route to an aimed node is detected.

For example, the distance as a search index is gradually extended from the current position to search nodes one after another. Every time a node is searched, the node at the shortest distance (which is not the node as a target) is determined. Finally, at the time point when the node as a target is detected, processing for searching a route is terminated. That is, for example, the concept of "equal distance" which can be recognized by the concept of "contour lines" is used, and the distance from the current node is extended to detect nodes on the "equal distance" one after another. At the time point when the node as a target can be detected finally, the processing of searching a route is terminated. Path search of DAIKISUTORA can be cited as a method of searching a route.

According to this kind of search for a route of the shortest distance, the route causing the shortest distance can be searched without searching all the routes that can exit with respect to a node as a target. Therefore, the route of the shortest distance can be detected in the shortest time. As a result, it is possible to reduce the load to the CPU and the like, which is required to perform this kind of search processing. Accordingly, the shortest route to the node as a target can be detected without searching all of the routes. The load caused by search from the entire network can be eliminated. For example, in case where the network which constructs this graph is of a large scale, the route can be searched with the load reduced.

Figure 15:
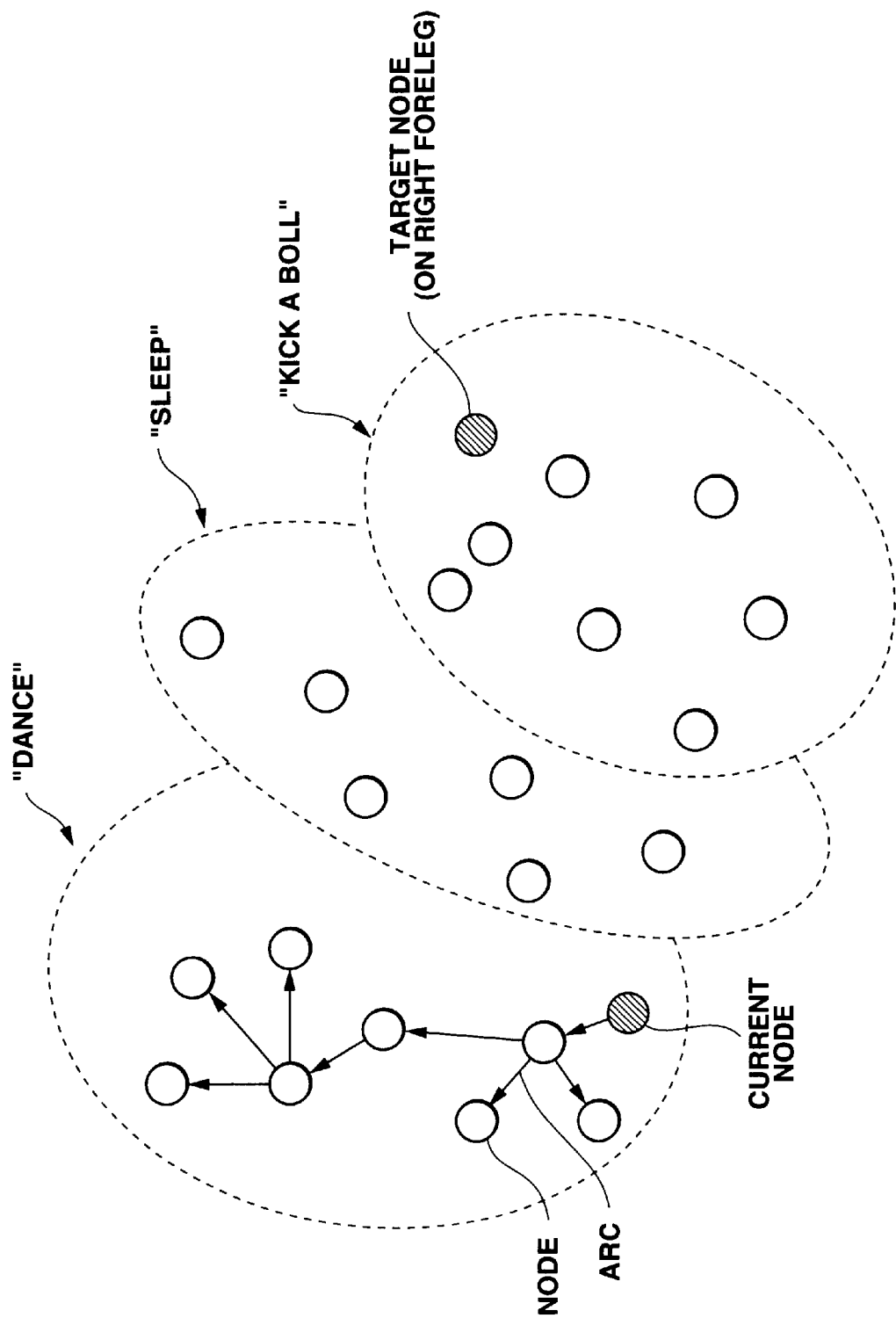
FIG. 15 is a view used for explaining a case of making a route search by classification.

Also, as shown in FIG. 15, the method of searching a route may be arranged as follows. Nodes are previously classified (clustered) roughly on the basis of actions or positions. A coarse search is carried out at first by clustering. Thereafter, a detailed search may be carried out. For example, when the robot apparatus is let take a position of "right front leg kick", an area of the class of "kick a ball" is selected at first as a route search range, and a path is then searched only in the area.

For example, coarse classes and elements thereof are related with each other, i.e., "kick a ball" and "right front leg kick" are related with each other by adding ID information and the like when designing this kind of system.

Between nodes, an oriented arc oriented in both directions to the nodes may exist. Therefore, there may be an oriented arc which returns from a node to which the robot apparatus once has transited. In this case, a returning oriented arc may be selected if there is no limitation to route search, and the transition may return to an original node, in some cases. To prevent this, it is possible to select an oriented arc which does not lead to a node which the robot apparatus has once passed.

In case where the node as a target cannot be reached, a result that a final position cannot be taken is outputted to an upper control means, a lower control means, or the like.

The above example has explained that the target is a position (node). However, the target may be a motion, i.e., an oriented arc or a self-motion arc. A case that the arc as a target is a self-motion arc will be a situation that leg parts 4 are let thrash or so.

In addition, it is possible to refer to weights added to oriented arcs and motion times of oriented arcs, as indexes for route search. If weights are added to oriented arcs, the following manner is taken.

The total sum of weights of oriented arcs existing on each candidate for the route from the current node to a node as a target is calculated, and comparison of the total sum is made for every candidate for the route. An optimal route (e.g., a route requiring the minimum cost) is selected.

The following will shows a case of considering the motion times (execution time) of oriented arcs.

Figure 16:
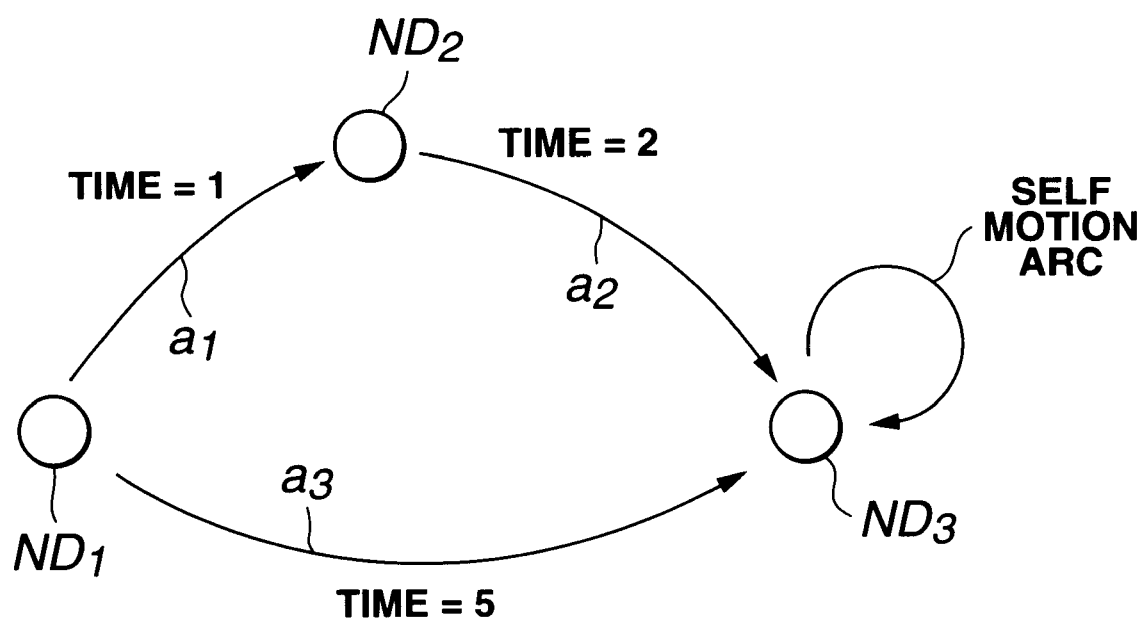
FIG. 16 is a view used for explaining a case where a route search is made by classification.

For example, if the current node transits to an aimed node through two oriented arcs wherein the two oriented arcs require respectively motion times of one second and two seconds, the transit time requires three seconds. Hence, if the current node $ND_1$ transits to an aimed node $ND_3$ in the graph as shown in FIG. 16, there are a case where the current node transits to the aimed node $ND_3$ through a node $ND_2$ and a case where the current node transits to an aimed node $ND_3$ only through an oriented arc $a_3$. Where the motion time is used as an index, the robot apparatus 1 can reach faster the aimed node $ND_3$ in a shorter time period in the former case of transition through the node $ND_2$ passes through the oriented arc $a_1$ which requires a motion time of one second and the oriented arc $a_2$ which requires a motion time of two seconds, while the latter case of transition only through the oriented arc $a_3$ which directly connects the current node $ND_1$ and the aimed node $ND_3$ to each other and which requires a motion time of five seconds. Accordingly, in case where the motion time is taken as an index, it is possible to make a position transition plan that the aimed node can be reached in the shortest time by the transition through two oriented arcs.

Also, the weights added to oriented arcs or the distances may be used as the difficulty levels of motions. For example, the fact that the difficulty level is low is set as a fact that the distance is short. Also, one of oriented arcs can be set as a default. By setting one of the oriented arcs as a default, it is possible that the default oriented arc is normally selected and another oriented arc which is not the default is selected only when an instruction is given.

As described above, by adding any indexes for route search to oriented arcs, i.e., by adding motion times or difficulty levels whose balances are difficult to keep to oriented arcs, it is possible to make a position transit plan which selects an optimal route by avoiding a large action. In addition, it is possible to make a position transit plan which selects a route of an optimal efficiency by adding energy consumption rates to oriented arcs.

Since there is a case where a plurality of oriented arcs exist between nodes, a probability of selection can be assigned to every oriented arc. That is, different probabilities are respectively assigned to arcs. In this manner, various motions can be selected between same nodes, so that a variety can be given to a series of motions. For example, when the sitting position transits to the standing position, a motion in which folded legs are once extended backwards and the robot apparatus then stands up on four legs or a motion in which front legs are expanded forwards and the robot apparatus then stands up is selected depending on the probabilities. In this manner, it is possible to bring about an effect that which motion the robot apparatus takes to stand up cannot be predicted before a selected motion is reproduced (or carried out actually).

More specifically, a probability Pi assigned to an oriented arc added with a weight or distance of mi can be expressed by the expression (1) where distances or weights of oriented arcs are $m_1, m_2, m_3, \ldots$ and the total sum thereof $(m_1+m_2+m_3+ \ldots)$ is M.

$$P_i = \frac{M - m_i}{(M - m_1) + (M - m_2) + (M - m_3) + \ldots} \quad (1)$$

In this manner, an oriented arc having a large weight is selected as a transit route at a low probability while an oriented arc having a small weight is selected as a passing route at a high probability.

Also, it is possible to limit the area where route search is carried out. For example, route search may be limited to routes within a predetermined range. In this manner, an optimal route can be searched in a much shorter time.

In addition, if an optimal route is selected by additionally executing weighting thereon, monotonousness in motions for compensation between distant positions can be avoided, and the probability of transition through a route of a high risk can be reduced.

Also, arcs (oriented arcs or self-motion arcs) can be registered in the graph as described below.

Figure 17:
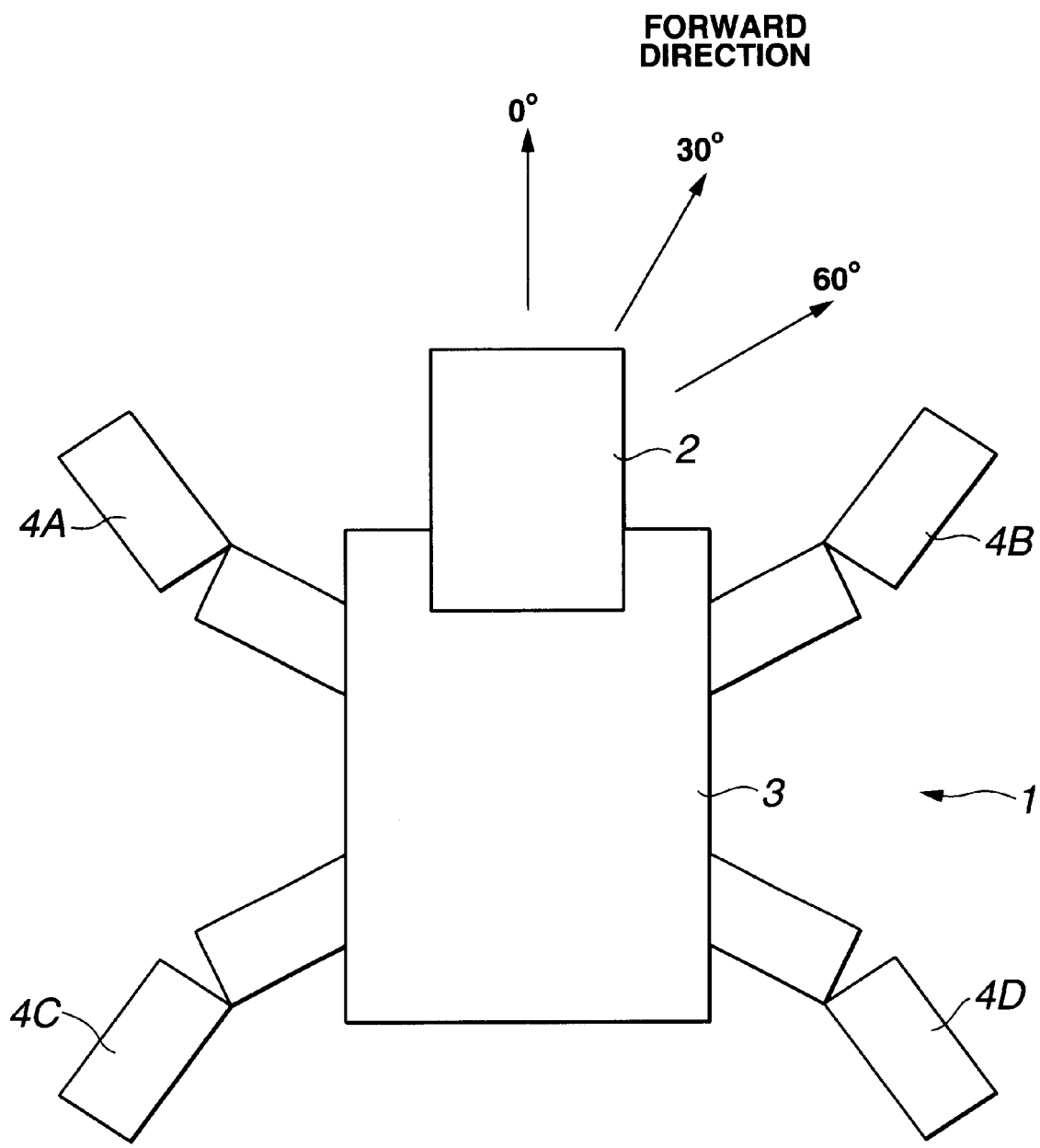
FIG. 17 is a top view of a robot apparatus, used for explaining a case where a walking direction is set as a parameter.

For example, a plurality of execution forms can be considered with respect to a motion of "walk". For example, as shown in FIG. 17, motions of walk in a direction of angle 0°, walk in a direction of angle 30°, and walk in a direction of angle 60° can be a plurality of execution forms. Providing a plurality of execution forms for one motion, i.e., increase of the number of parameters concerning one motion leads to enrichment of expressions of the robot apparatus 1. These motions can be achieved by providing arcs having those different parameters.

Meanwhile, this provision of arcs having different parameters corresponding to a plurality of execution forms is not preferred for the aspect of effective use of resources of a network. This is because ninety one arcs are required, in case of executing motions of walking in different directions at a regular interval of 1° from 0° to 90°.

Therefore, "walk" is set as a path, and the walking directions are set as parameters. For example, in a self-motion arc, "walk!" is instructed and a walking direction is optionally supplied as a parameter at this time. "Walk" is carried out in the direction specified by the parameter when the motion is reproduced. As a result of this, the instruction of "walk" can be accomplished with the walking direction finely set and without necessitating a plurality of self-motion arcs, if only one self-motion arc of "walk" and a parameter of the walking direction are provided. In this manner, the graph can be simplified even if the scenario varies. Network resources can be used effectively.

Specifically, information concerning a parameter of a motion, such as a walking direction, is added as additional information to action command information S16. The position transit mechanism part 42 sends position transit information S16 having a content of "walk" and added with such a parameter, to the control mechanism part 43.

The above-described embodiment has explained a case of adding a parameter to a self-motion arc. The present embodiment is not limited hitherto but a parameter may be added to an oriented arc. Accordingly, it is unnecessary to prepare a plurality of oriented arcs which have different "walking directions" as parameters although the motion of "walk" is common to the oriented arcs.

In case of repeating one same motion, information of "three times" is optionally supplied as the number of times to be repeated. As a result, the command forms can be simplified. In this manner, for example, when the robot apparatus is let walk three steps, this instruction can be executed by an instruction form of "walk!" and "three times", in place of issuing the command of "walk!" three times or issuing a command of "walk three times (steps)!". In this manner, the arcs or node which constructed by such instruction forms can be maintained with the information amount reduced. In addition, since the number of repetitions can be specified, the number of time for which instructions are issued and the time period until an instruction is transmitted can be shortened.

Figures 18, 19:
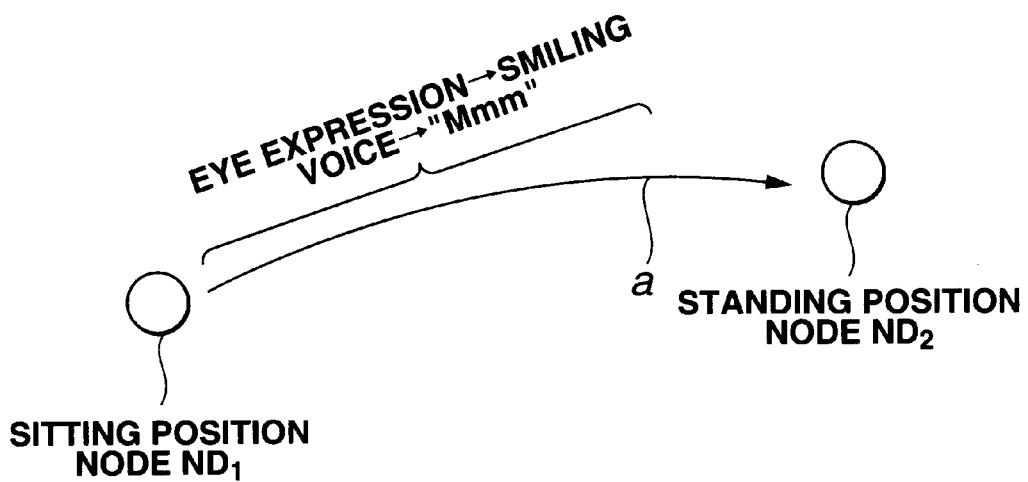
FIG. 18 shows a table showing parameters and contents of motions.
FIG. 19 is a view used for explaining a case where another motion is synchronized with a motion during transit between positions.

For example, as shown in FIG. 18, information of "one step walk" as an instruction for a motion of walk step by step is outputted to the control mechanism part 43, and "3" is instructed as a parameter thereof. In this manner, a motion of walking only three steps is achieved. Also, by instructing "7" as a parameter, the robot apparatus is let make a motion of walking seven steps. Further, by instructing "−1" as a parameter, the robot apparatus can be let keep walking until another instruction is given with respect to legs.

Also, the robot apparatus is let repeat a motion. A stop command for stopping a repetitive motion is given later to the control mechanism part 43. In this manner, the robot apparatus can be let execute repeatedly one same motion.

Also, a predetermined arc can be executed with an expression pasted thereon. That is, in case where a predetermined motion (arc) is executed, it is possible to let the robot apparatus execute a motion as another expression in synchronization with the predetermined motion. For example, as shown in FIG. 19, in case where an oriented arc a for transiting from the node $ND_1$ of the sitting position to the node $ND_2$ of the standing position is set, a predetermined voice or motion can be let correspond to the predetermined oriented arc a. In this manner, an expression of smiling eyes or a voice of "Mmm" can be reproduced in synchronization with a motion of transiting from the sitting position to the standing position. Thus, a thick expression is enabled by a combination of different parts, thereby involving an effect that the scenario is enriched.

Figure 20:
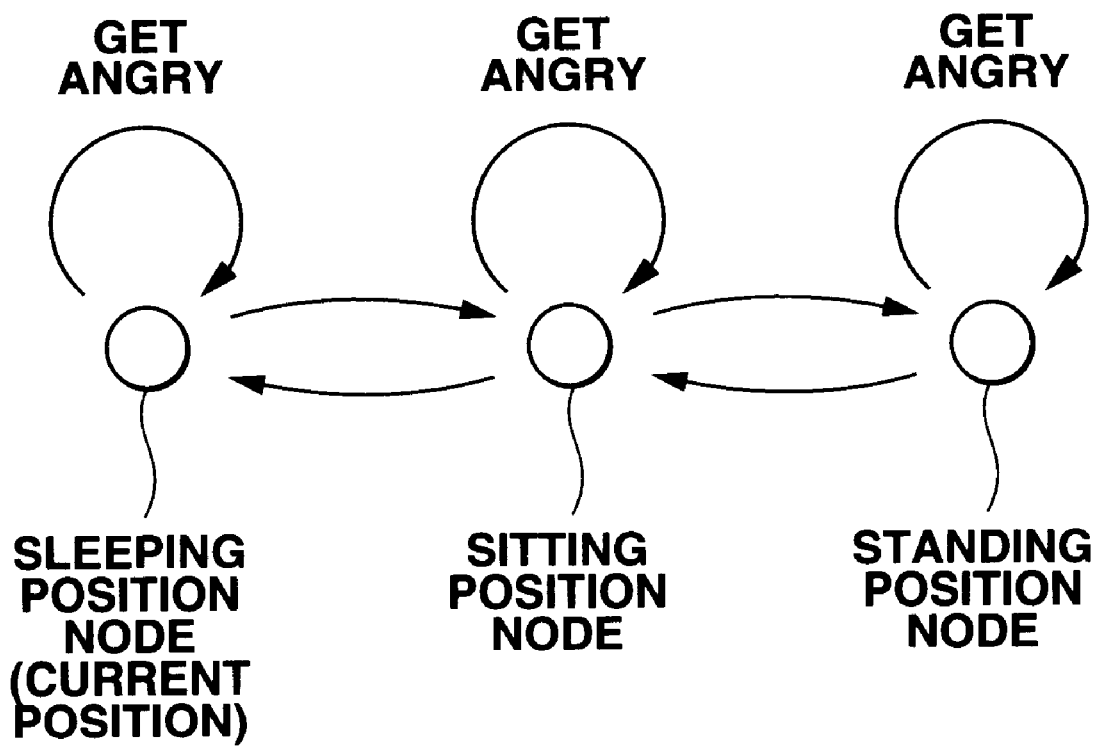
FIG. 20 is a view used for explaining a case where similar motions are executed at different positions.

In some cases, self-motion arcs connected to nodes overlap each other. An example thereof will be the case where a motion of getting angry is made at each of the nodes of the sleeping position, sitting position, and standing position, as shown in FIG. 20.

In this case, a motion named "angry" is named to each of motions expressing anger, such as a self-motion arc from the sleeping position to the sleeping position, a self-motion arc from the sitting position to the sitting position, and a self-motion arc from the standing position to the standing position. Then, by merely supplying an instruction of "anger", the closest motion (self-motion arc) of "angry" can be searched by shortest route search. That is, the shortest executable route among aimed motions (self-motion arcs) is selected as a position transit plan. In this manner, for example, when action command information S16 of "angry" is sent in case where the current position is the closest to the sleeping position, a motion of scraping the ground in the sleeping position is executed as a motion of getting angry which is connected as a self-motion arc of the node of the sleeping position.

If there is a self-motion arc of executing thus one same motion at each of a plurality of nodes and if an instruction for such a predetermined motion is given, a motion can be executed in an optimal position (the position at the shortest distance) by the shortest distance search. In this manner, the upper control means can execute an instructed motion without necessitating constant grasp of states or motions of respective parts. That is, for example, the upper control means (position transit mechanism part 42) needs only to grasp the current node if the command of "angry" is given. A position transit plan up to a motion of getting angry in the sleeping position at the shortest distance can be prepared by only searching the self-motion arc of "angry" without searching an actual node of "getting angry in a sleeping position".

Also, as described above, if a motion of one same system is instructed by one same name, an optimal motion is searched and selected on a previously registered graph, based on the current position. Therefore, a motion instruction such as "angry" or the like, which has abstract and rich patterns, can be instructed in a simple manner.

Figure 21:
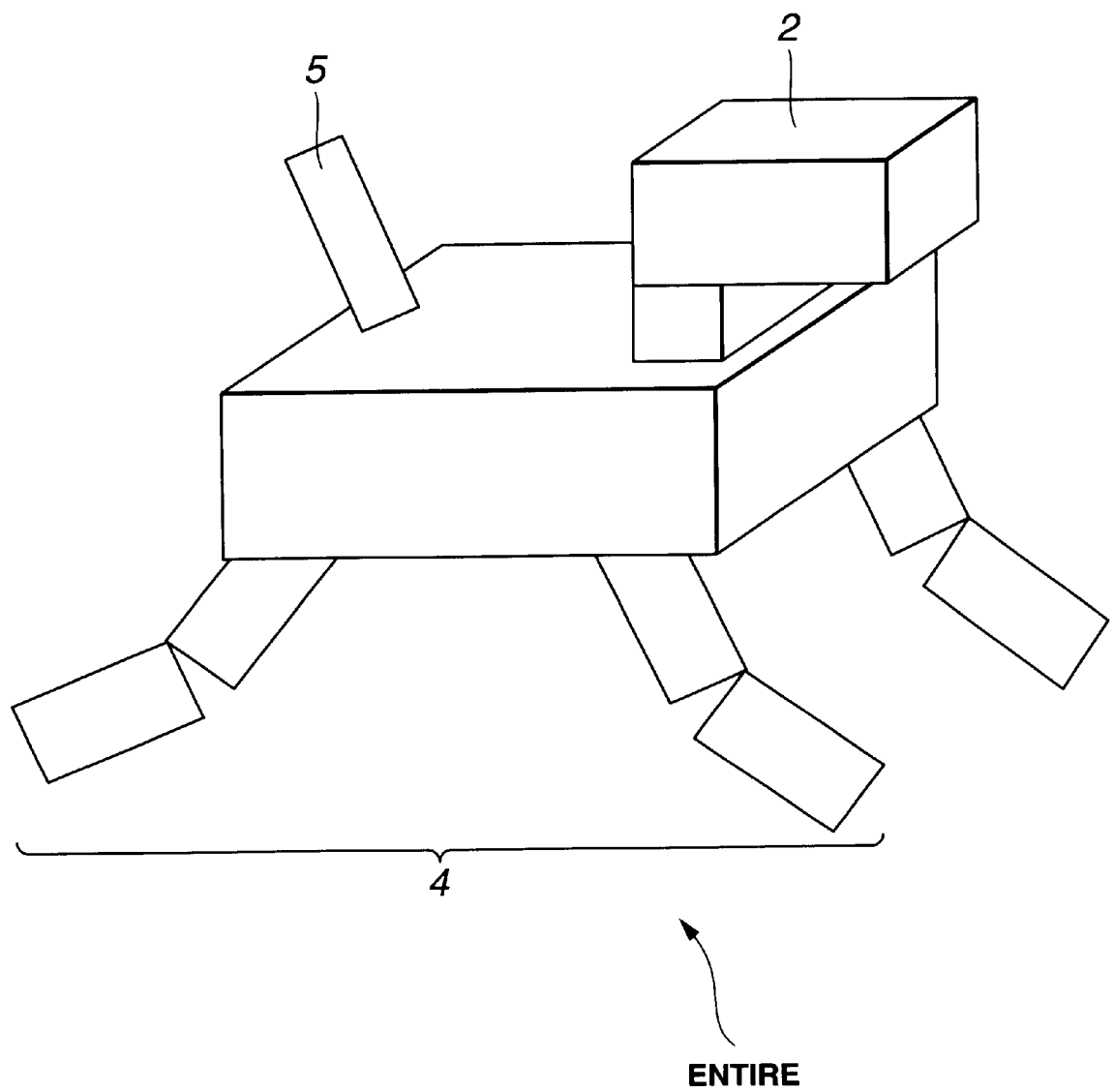
FIG. 21 is a perspective view showing a robot apparatus.

The robot apparatus 1 can operate separately respective componential parts of itself. That is, commands concerning respective componential parts can be executed. Such componential parts of the (entire) robot apparatus 1 will be the head part 2, leg parts 4, and tail part 5, as shown in FIG. 21.

In the robot apparatus 1 thus constructed, the tail part 5 and the head part 2 can be moved individually. That is, since resources of these parts do not compete with each other, these parts can be operated individually. Meanwhile, the entire robot apparatus 1 and the head part 2 cannot be moved individually. That is, since resources of the entire apparatus and this part compete with each other, the entire robot apparatus 1 and the head part 2 cannot be moved individually. For example, contents of a command concerning the head part 2 cannot be executed while a motion of the entire apparatus, a command of which contains a motion of the head part 2, is being executed. For example, it is possible to swing the tail part 5 while swinging the head part 2. On the other hand, it is impossible to swing the head part 2 while a trick is carried out by the entire apparatus.

Table 1 shows combinations of resources in cases where resources compete with action command information S16 supplied from the action determination mechanism part 41 and resources do not compete with it.

TABLE 1

| COMBINATION OF PARTS | COMPETITION OF RESOURCES |
| --- | --- |
| HEAD, TAIL | NO |
| HEAD, ENTIRE | YES |
| LEGS, ENTIRE | YES |
| HEAD, LEGS, TAIL | NO |

Thus, if commands whose resources compete with each other are supplied, either a command concerning a motion of the entire apparatus 1 or a command concerning a motion of the head part 2 must be executed in advance. The following will explain processing in case where such commands are executed.

In case where either one command is executed in advance because resources compete with each other, e.g., in case where the motion of the entire apparatus 1 is finished and a command concerning the head part 2 is then executed, the motion of the head part 2 is started from the last position attained through the motion of the entire apparatus 1. However, the last position after the motion of the entire apparatus 1 is not always a position suitable for the head part 2 to start a motion. The head part 2 makes a sharp motion which results in an unnatural behavior if the motion of the head part 2 is started in a state where the last position after the motion of the entire apparatus 1 is not suitable for the head part 2 to start a motion, i.e., in case where positions before and after transition takes place in response to a different command are not continuous with each other. This is a problem caused in case where the current position (or motion) and the aimed position (or motion) are associated with the entire robot apparatus 1 and the componential parts thereof, and the network (graph) composed of nodes and arcs constructed for controlling the entire robot apparatus 1 and the network (graph) composed of nodes and arcs constructed for controlling the respective componential parts of the robot apparatus 1 are constructed separately without any association provided therebetween.

An unnatural motion which the robot apparatus 1 makes due to discontinuous positions before and after transition as described above can be eliminated by preparing a position transit plan such that transit motions continue smoothly. Specifically, this problem is eliminated by preparing a position transit plan adopting a basic position common to the entire apparatus and the componential parts on graphs.

Explained below will be a case where information concerning a network used for the position transit plan of the robot apparatus 1 is constructed into a hierarchical structure, as a whole, from information (graph) concerning the entire network and information (graph) concerning the network of respective componential parts. For example, information used for the position transit plan, which is composed of the information (graph) concerning the entire network and the information (graph) concerning the componential parts, is constructed in the position transit mechanism part 42 as shown in FIG. 8 described above.

Figure 22:
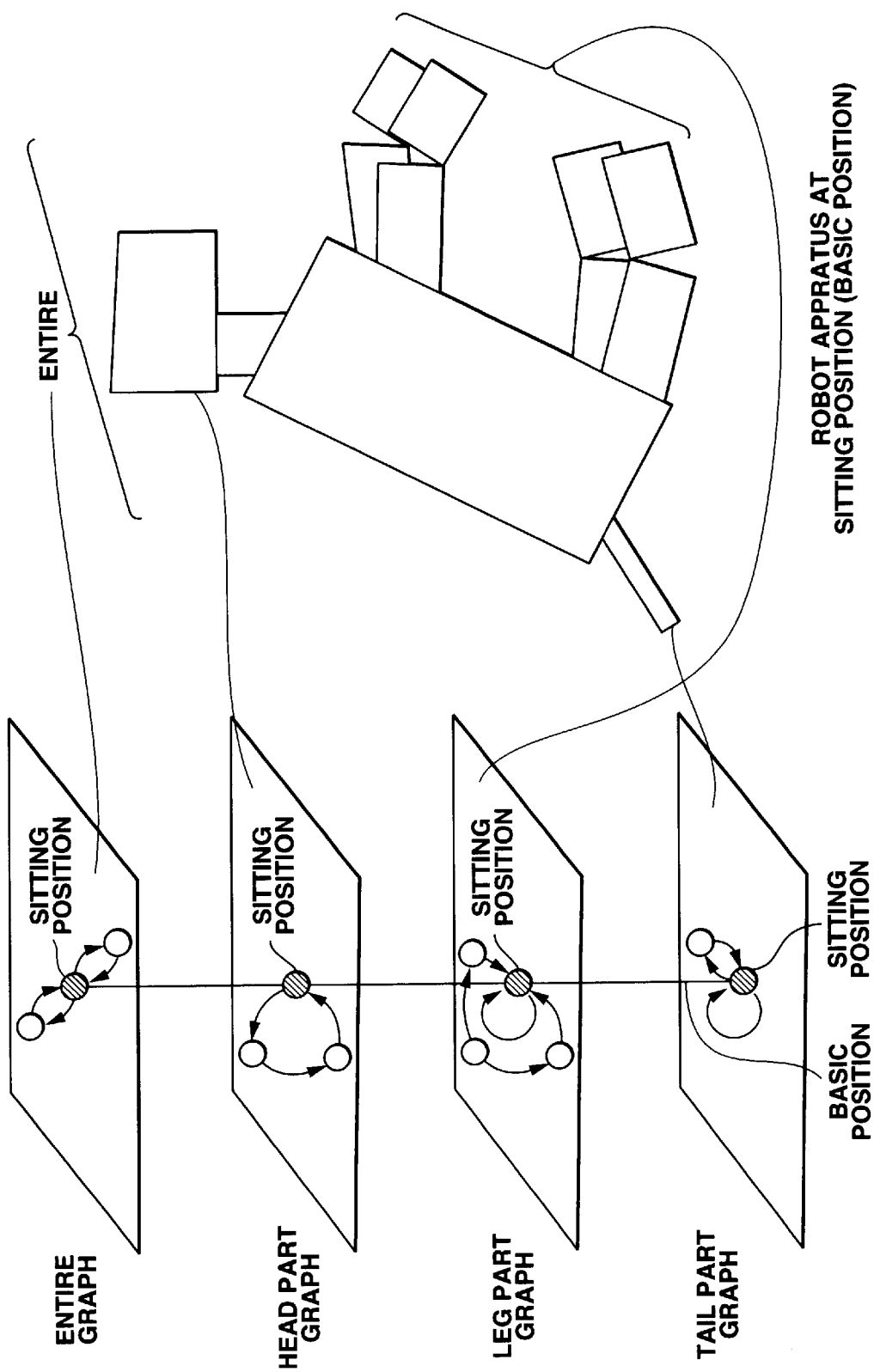
FIG. 22A and FIG. 22B are views used for explaining a case of positions are let transit between the entire apparatus and parts, with a basic position inserted therebetween.

The basic position is a position to which the robot apparatus temporarily transits to shift the state between an motion of the entire and a motion of componential parts. An example of the basic position is a sitting position as shown in FIG. 22B. A procedure of smoothly connecting transit motions will be explained with respect to a case where the sitting position is set as a basic position.

Figure 23:
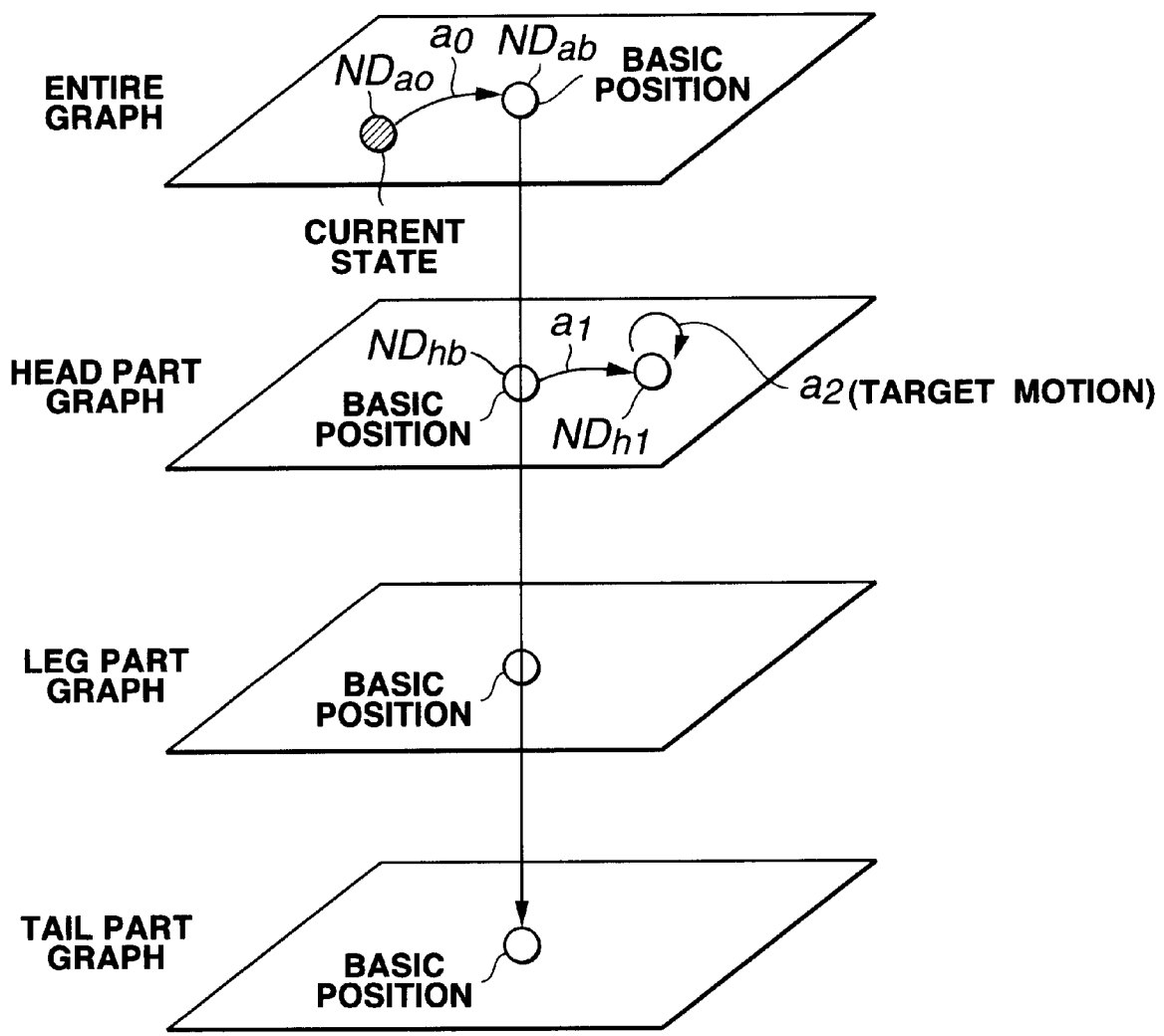
FIG. 23 is a view used for explaining a case of executing an aimed motion after the current position is once let transit to a basic position when the current position relates to the entire apparatus and the aimed motion relates to a part.

Specifically, explanation will be made of a case where the current position is grasped as a position $ND_{a0}$ on the graph of the entire apparatus, as shown in FIG. 23, and a motion $a_2$ of the head part is executed as a target.

On the graph of the entire apparatus, an oriented arc $a_0$ which lets the position of the entire robot apparatus 1 transit from the current position $ND_{a0}$ to the basic position $ND_{ab}$ is selected. If the entire apparatus takes the basic position, the entire apparatus is grasped as being in the state (node) of the basic position on the graphs of the head part, leg parts, and tail part.

On the graph of the head part, an optimal oriented arc $a_1$ is selected from the state of the basic position $ND_{hb}$, and a route to an aimed motion (self-motion arc) $a_2$ of the head part 2 is determined.

At this time, a search for a route from the current position $ND_{a0}$ to the basic position $ND_{ab}$ on the graph of the entire apparatus and a search for a route from the basic position $ND_{hb}$ to an aimed motion $a_2$ on the graph of the head part are carried out by means of the shortest distance search as described above.

According to this procedure, selection of a transit route (position transit plan) which smoothly connects motions of the entire apparatus and the componential part is made on the graphs of the entire apparatus and the head part. Further, the control mechanism part 43 outputs position transit information S19 to the control mechanism part 43, based on the position transit plan.

Figure 24:
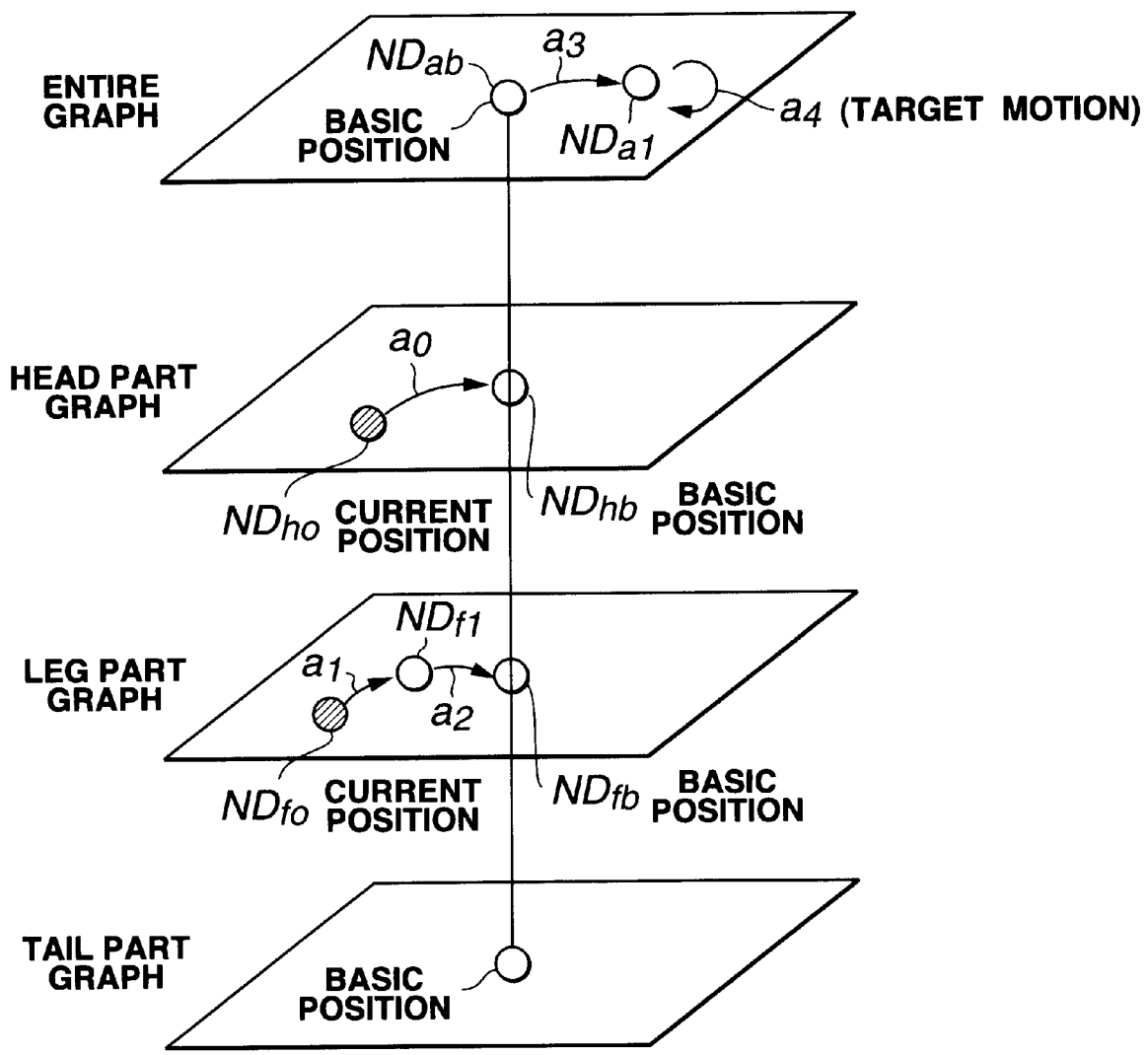
FIG. 24 is a view used for explaining a case of executing an aimed motion after the current position is once let transit to a basic position when the aimed motion relates to the entire apparatus.

The above example is a specific example in which a motion of the entire apparatus is continued smoothly to a motion of a componential part. Explained next will be a specific example in which a motion of a componential part is continued smoothly to a motion of the entire apparatus. More specifically, as shown in FIG. 24, explanation will be made of the case where the head part 2 is grasped as being in a position $ND_{h0}$ on the graph of the head part, the leg parts 4 are grasped as being in a position $ND_{f0}$ on the graph of the leg parts, and a motion $a_4$ of the entire apparatus is executed as a target.

On the graph of the head part, an oriented arc $a_0$ which lets the position of the head part 2 transit from the current position $ND_{h0}$ to the basic position $ND_{ab}$ is selected. On the graph of the leg parts, oriented arcs $a_1$ and 12 which let the position of the leg parts 4 transit from the current position $ND_{f0}$ to the basic position $ND_{fb}$ through the position $ND_{f1}$. Suppose that the tail part 5 has originally been in the basic position. If respective componential parts come to their basic positions, the position is grasped as a basic position also on the graph of the entire apparatus.

Further, on the graph of the entire apparatus, an optimal oriented arc $a_3$ is selected from the state of the basic position $ND_{hb}$, and a route to the motion (self-motion arc) $a_4$ of the entire apparatus is determined.

For example, the motion of each componential part may be executed at the same time when a motion of another componential part is executed to transit to a basic position, or the motion of each componential part may be executed with limitations added. For example, the motion of each componential part may be executed at a certain timing. Specifically, in case where a command is issued with respect to a motion of the entire apparatus 1 while the head part 2 is used to make a trick, the head part 2 cannot transit to the basic position $ND_{hb}$ because it is just executing a trick. Therefore, the leg parts 4 are firstly brought into the state of the basic position $ND_{fb}$, and the had part 2 is then let transit to the state of the basic position $ND_{hb}$ after it finishes the trick.

Also, each componential parts can be arranged to move in consideration of the balance of the position of the entire apparatus 1. For example, if the head part 2 and the leg parts 4 are moved simultaneously or if the head part is firstly set in the basic position $ND_{hb}$, the balance is lost and the robot apparatus stumbles over. In this case, the leg parts 4 are firstly brought into the state of the basic position $ND_{fb}$, and the head part 2 is then let transit to the state of the basic position $ND_{hb}$.

By preparing a position transit plan in which the state is let once transit to the basic position, motions can be continued smoothly.

In addition, if resources of the parts not used are released, the resources can be used for another purpose. For example, if the resources of the head part 2 are released while the robot apparatus is walking, the head part 2 can be let track (follow) a moving ball.

Note that the basic position is not limited to one basic position. For example, a plurality of positions such as the sitting position, sleeping position, and the like can be set as basic positions. In this manner, a shift from a motion of the entire apparatus to any of motions of componential parts or a shift from any of motions of componential parts to a motion of the entire apparatus can be achieve by a shortest motion through a shortest distance (or shortest time). Also, this setting of a plurality of basic positions leads to enrichment of expressions of the robot apparatus 1.

Also, a determination or the like of a position or motion in the position transit mechanism part 42 as described above is made on the basis of action command information S16 from the action determination mechanism part 41. Further, the action determination mechanism part 41 normally sends the action determination instruction information S16 to the position transit mechanism part 42 without limitations. That is, while a motion is executed, a command concerning another motion is issued, and the command thus issued is sent to the position transit mechanism part 42. There is provided a command storage part for storing action command information S16 sent from the position transit control part 42 in correspondence with the command. This command storage part stores action command information S16 generated by the action determination mechanism part 41 and can further perform a so-called list operation. The command storage part is, for example, a buffer.

In this manner, if a command sent from the action determination mechanism part 41 cannot be executed at present, e.g., when a tick (predetermined motion) is being carried out, the command thus sent is stored into the buffer. For example, a newly sent command D is newly added as a list to the buffer, as shown in FIG. 25A. After the trick is finished, normally, the oldest command is picked up from the buffer, and a route search is carried out. For example, if commands are stored as shown in FIG. 25A, the oldest command A is executed at first.

Commands are thus stored into the buffer and are executed one after another in the order from the oldest command. However, it is also possible to perform a list operation to insert or cancel a command.

As for insertion of a command, a command D is inserted into a command group which has been stored. In this manner, a route search for the command D can be executed, prior to commands A, B, and C waiting for execution.

As for cancellation of a command, a command which has already been stored in a buffer is cancelled. In this manner, a command unnecessitated due to any reason is prevented from execution.

The buffer can include a plurality of command storage areas corresponding to the entire robot apparatus 1 and the respective componential parts. In this case, commands for motions of each the entire apparatus and the componential parts are stored as shown in FIG. 26. By thus comprising areas for storing commands corresponding to the entire and the componential parts, the following operation is enabled.

Figure 27:
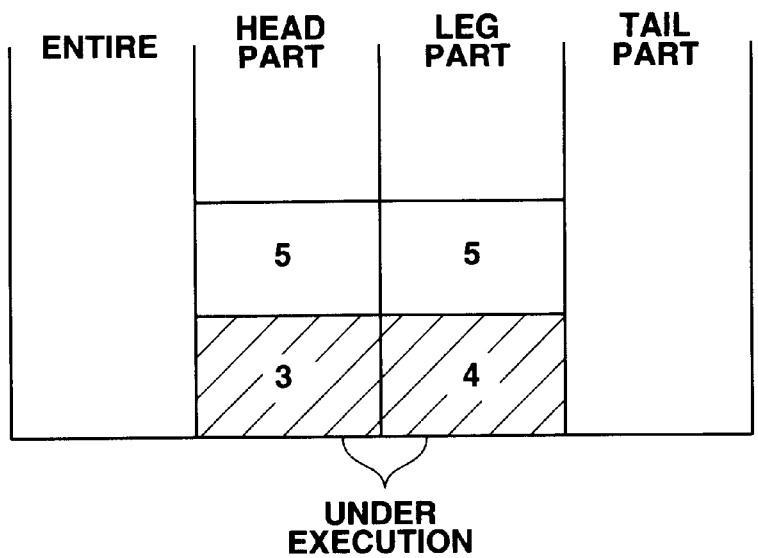
FIG. 27 is a view used for explaining an example of processing form by a command storage part which can store commands corresponding to the entire apparatus and componential parts.

It is possible to add synchronization information for reproducing motions of different componential parts such as the head part and the leg parts in synchronization with each other. For example, as shown in FIG. 27, commands respectively stored in the command storage areas of the head part 2 and the leg parts 4 are added with information concerning numbers of the order in which reproductions of commands are to be started. Information indicating one same number, e.g., information whose reproduction should be started fifth is assigned as synchronization information.

In this manner, if the third motion of the head part 2 whose execution has been started earlier by two ranks should end before the fourth motion of the leg parts 4 whose execution has been started earlier by one rank, execution of only the fifth command is prevented from being started, with respect to the head part 2. After waiting until reproduction of the fourth motion of the leg parts 4 which is added with the information of the fifth rank is finished, reproduction requests for the motions of the head part 2 and the leg parts 4 which are added with the information of the fifth ranks can be issued simultaneously. In this manner, for example, it is possible to realize expressions of the robot apparatus 1 with a greater impact by issuing start of the motion of swinging laterally the head part 2 and start of the motion of inclining the leg parts 4 leftward and rightward.

Also, by the list operation, a plan of a series of motions before and under execution can be stopped halfway or a command with a higher priority can be inserted later into a higher rank. Therefore, it is possible to construct a scenario with enough flexibility.

Figure 28:
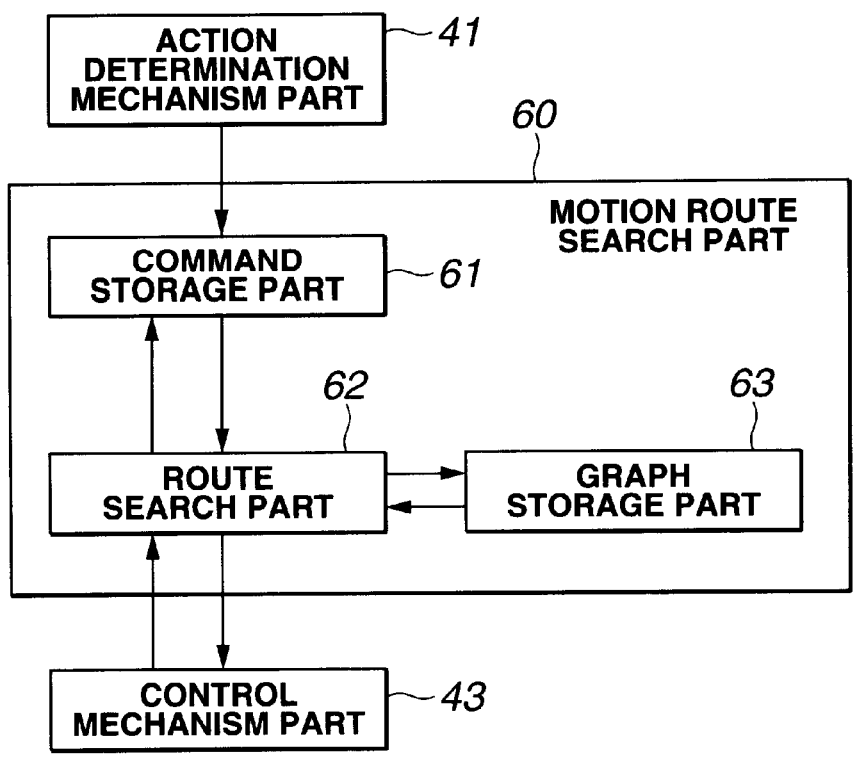
FIG. 28 is a block diagram showing a motion route search part which makes a route search.

As described above, a search for an optimal route to an aimed position or motion based on action command information S16 sent from an action determination mechanism part 41, and a determination of a position transit plan are realized because the position transit mechanism part 42 comprises a motion route search device 60 as shown in FIG. 28.

The motion route search part 60 comprises a command hold part 1, a route search part 62, and a graph storage part 63.

A command concerning the entire apparatus and the componential parts is supplied to the motion route search part 60 from the action determination mechanism part 41. For example, an aimed position or an aimed part (e.g., the head part) of a motion, a command for a list operation with respect to a current command and a series of commands issued in the past, information concerning the characteristic of the command itself, or the like is appended to action command information S16. In the following, the information thus appended will be called appended information.

The command for a list operation with respect to a current operation and a series of commands issued in the past is a command for inserting a newly issued command explained with reference to FIG. 25B, into the top of a group of commands which are not yet executed. Also, information concerning the characteristic of the command itself (hereinafter called command characteristic information) is a parameter concerning the walking direction, which has been explained in FIG. 17, a parameter concerning a command, which has been explained in FIG. 18, e.g., the parameter of "three steps" where the motion is "walk forward", or information for synchronizing another notion, which has been explained in FIG. 19.

The command storage part 61 serves to store action command information S16 sent from the action determination mechanism part 41, as described above, and is a buffer, for example. The command storage part 61 performs processing based on the contents of appended information, if action command information S16 has appended information. For example, if a command for inserting a command as information concerning a list operation is included in the appended information, an operation for inserting action command information S16, which has just reached, at the top of the row of commands in a standby state in the command storage part 61 is carried out together in accordance with the contents of the command.

Also, if there is command characteristic information as appended information, the command storage part 61 stores it together with the command.

This command storage part 61 grasps what command is being executed and what command is waiting at what rank in the order. To realize this, for example, commands are stored with order ranks added.

In addition, the command storage part 61 has four storage areas corresponding to the entire apparatus 1, the head part 2, the leg parts 4, and the tail part 5, as has been described previously. Further, the command storage part 61 can make a determination that a command for moving the entire apparatus cannot be executed while a command for moving the head part 2 is being executed or a determination that a command which is now moving the head part and a command for moving the leg parts 4 can be issued independently from each other. That is, it is possible to perform processing which prevents resources of the entire apparatus and the componential parts from competing with each other, so that a so-called solution for competition between resources can be achieved.

Also, the command storage part 61 remembers the ranks of the order in which commands have been issued over different parts. For example, if commands are supplied in the order from the entire apparatus 1 to the leg parts 4, the head part 2, and the entire apparatus 1, the commands concerning the entire apparatus 1 are stored as commands executed first and fourth in the command storage part 61, the command concerning the leg parts 4 is stored as a command executed second, and the command concerning the head part 2 is stored as a command executed third. Thus, the order of the commands remembers the order. In this manner, at first, the command storage part 61 sends a command concerning the entire apparatus 1, which has been executed first, to the route search part 62. As soon as reproduction of the contents of the command is finished, the command storage part 61 sends the command concerning the leg parts 4, which has been executed second, and the command concerning the head part 2, which has been executed third. After the componential parts finish reproduction of the contents of these commands, the command storage part 61 sends the command concerning the entire apparatus 1, which has been executed fourth, to the route search part 62.

The route search part 62 starts a so-called route search by the command supplied from the command storage part 61. The graph storage part 63 stores graphs corresponding to the parts sectioned in the command storage part 61. That is, the graph storage part 63 stores graphs corresponding to the entire apparatus 1, the head part 2, the leg parts 4, and the tail part 5. Based on the graphs stored in the graph storage part 63, the route search part 62 searches an optimal route to an aimed position or motion as the contents of a command, using the distance or weight described previously as an index.

Further, based on the position transit plan obtained by the route search, the route search part 62 sends position transit information S18 to the control mechanism part 43 until an aimed position or motion is executed.

As described above, the position transit mechanism part 42 searches an optimal route to an aimed position or motion in accordance with a command and prepares a position transit plan, based on action command information S16 sent from the action determination mechanism part 41. In accordance with the position transit plan, the position transit mechanism part 42 outputs the position transit information S18 to the control mechanism part 43.

(3-5) Processing in Control Mechanism Part

Returning to FIG. 3, the control mechanism part 43 generates a control signal S5 for driving actuators 23, based on position transit information S18. The part 43 then sends this signal to the actuators 23, to drive the actuators 23. Thus, the robot apparatus 1 is let make a desired motion.

Also, the control mechanism part 43 returns a end notification (reproduction result) made on the basis of the position transit information S18, to the route search part 62, until an aimed position or motion is reached. The route search part 62 which has received an end notification notifies the graph storage part 63 of the end of the motion. The graph storage part 63 updates information on the graph. That is, for example, if the position transit information S18 is to let the leg part 2 make a motion of transiting from the state of the sleeping position to the state of the sitting position, the graph storage part 63 which has received an end notification moves the graph position of the node of the leg part 2 corresponding to the sleeping position to the graph position of the sitting position.

For example, if an aimed motion is to "thrash legs" (self-motion arc) in the sitting position, the route search part 62 further sends "thrash legs" as position transit information S18 to the control mechanism 43. The control mechanism part 43 generates control information for thrashing the leg parts 4, based on the position transit information S18, and sends this information to the actuators 23 to execute a motion of thrashing leg parts 4. When the control mechanism part 43 completes reproduction of a predetermined motion, the control mechanism part 43 sends an end notification thereof again to the route search part 62. The route search part 62 notifies the graph storage part 63 of the completion of the motion of thrashing the leg parts 4. However, in case of a self-motion arc, it is unnecessary to update information on the graphs, and therefore, the current position of the leg parts 4 goes to the sitting position. However, the position at the end of thrashing the leg parts 4 is the sitting position of the leg parts, which is equal to the position before this motion was started. Therefore, the graph storage part 63 does not change the current position of the leg parts.

Meanwhile, the route search part 62 notifies the command storage part 61 of that reproduction of an aimed position or motion has ended. Since the aimed position or motion has been completed without problems, i.e., since the contents of the command have been accomplished without problems, the command storage part 61 erases the command. For example, if thrashing of legs is supplied as an aimed motion as described above, this command is erased from the command storage area of the leg parts 4.

As described above, the action determination mechanism part 41, the motion route search part 60, and the control mechanism part 43 transmits information, so basic functions of the action determination mechanism part 41, the motion route search part 60, and the control mechanism part 43 are realized.

Figure 29:
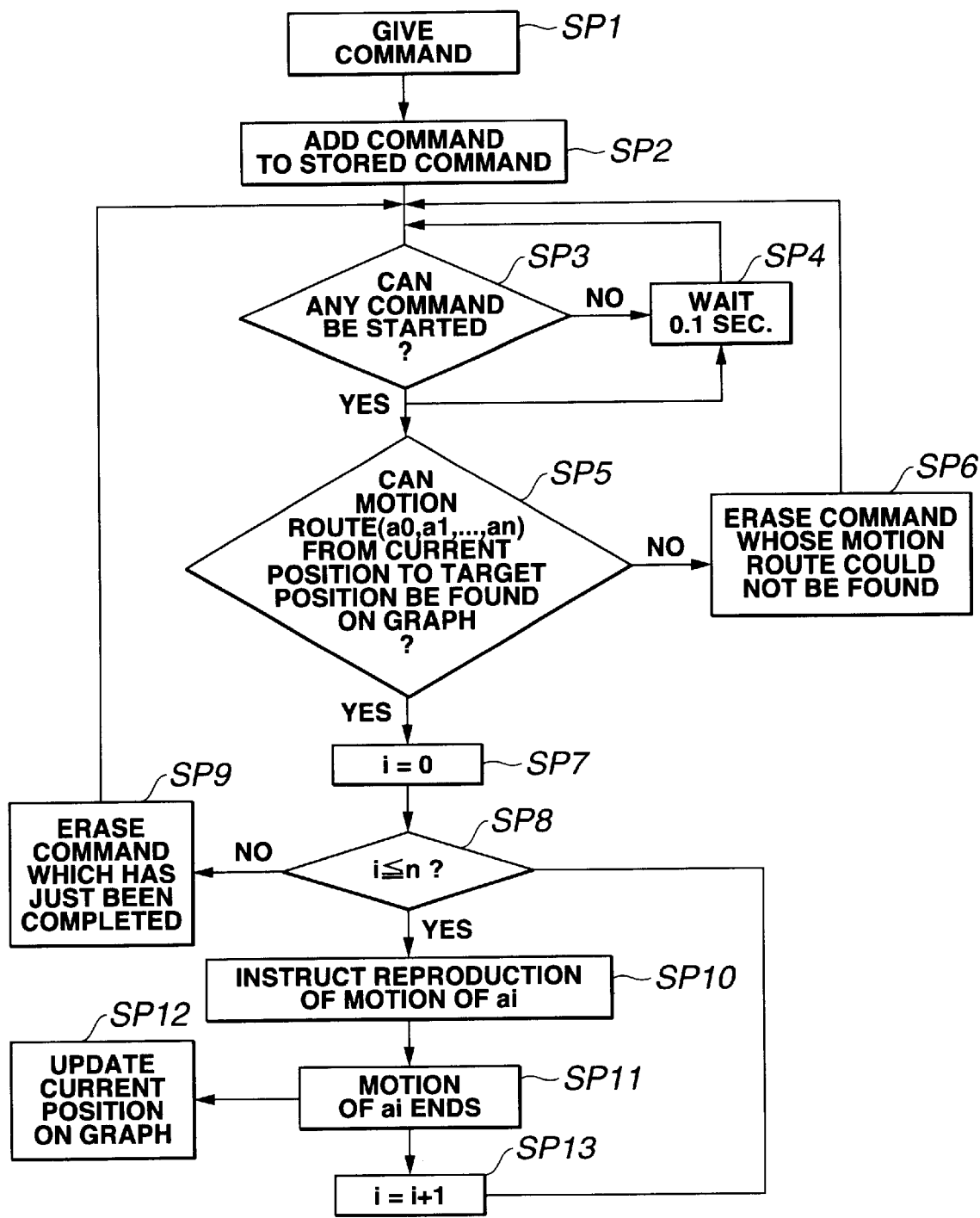
FIG. 29 is a flowchart showing a series of processing until a motion is executed in accordance with a command.

FIG. 29 shows a series of processing procedures of a route search in the motion route search part 60, which is carried out on the bases of the command generated in the action determination mechanism part 41, and motions which are carried out on the basis of a route search result.

At first, in a step SP1, the action determination mechanism part 41 supplies a command to the motion route search part 60. In a subsequent step SP2, the command storage part 61 of the motion route search part 60 adds the command to a command group.

For example, as shown in FIG. 26, a command concerning the tail part is added. If command information for making an insertion is added as a list operation to the command, the command is inserted into a row of commands in accordance with the command information.

In a subsequent step SP3, the command storage pail 61 determines whether or not there is a command which can be started.

For example, it is determined that there is no command that can be started, if the first command concerning the entire apparatus is being executed in case where the command storage part 61 grasps a command concerning the entire apparatus as a first command (being currently reproduced), stored command s concerning the head part as second and third commands, a command concerning the leg parts as a fourth command, and stored commands concerning the tail part 5 as fifth and sixth commands.

If there is no command that can be started, the processing goes to the step SP4. Othewise, if there is a command that can be started, the processing goes to the step SP5. At the time point when the processing goes to the step SP3, a command concerning a componential part cannot be executed while the entire robot apparatus 1 is making a motion. Therefore, the processing goes to the step SP4. Meanwhile, if the motion has ended at the time point when the processing goes to the step SP3, the processing further goes to the step SP5.

In the step SP4, the command storage part 61 waits for elapse of a predetermined time. For example, after waiting for elapse of 0.1 second, the command storage part 61 determines again whether or not there is a command that can be started, in the step SP3.

For example, if the command concerning the entire apparatus, which was being executed, has been finished after waiting for elapse of 0.1 second in the step SP4, the second command concerning the head part, the fourth part concerning the leg parts, and the fifth command concerning the tail parts are grasped as commands that can be started, in the step SP3.

The third command concerning the head part is grasped as a command that can be started, as soon as execution of the second command concerning the head part is finished. The sixth command concerning the tail part is grasped as a command that can be started, as soon as execution of the fifth command concerning the head part is finished.

Thus, in case where there is no command that can be started immediately in the step SP3, the processing goes to the step SP4 and waits for elapse of a predetermined time. In this manner, the processing waits for completion of a predetermined motion in the entire apparatus or componential parts. A next command can be executed at a suitable timing.

In the step SP5, based on the contents of a next command sent from the command storage part 61, the route search part 62 determines whether or not a motion route to an aimed position from the current position on the graph corresponding to the command stored in the graph storage part 63 can be found.

Figure 30:
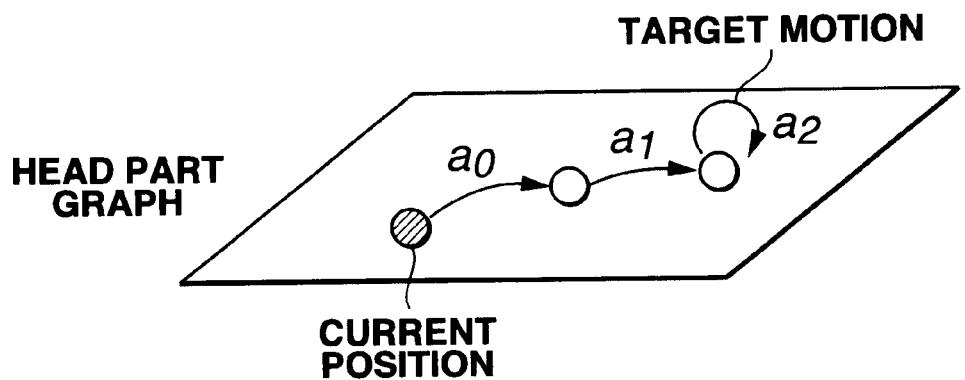
FIG. 30 is a view used for explaining that the current position transits through a plurality of oriented arcs to an aimed motion, on the graph of a head part.

For example, in case of a command concerning a motion of the head part 2, the route search part 62 determines whether or not there is a route that can reach an aimed state or motion from the current position (state) on the graph of the head part, as shown in FIG. 30. The case where a route can be found is a case where there is a path (arc) that can reach an aimed state or motion from the current position (state). As shown in FIG. 30, this is a case where there are a plurality of oriented arcs $a_0$ and $a_1$ that can reach an aimed position from the current position. The case where no route can be found is a case where there is no path to an instructed state or motion.

If no transit route is found to an aimed position from the current position, the processing goes to the step SP6. Otherwise, if a transit route is found, the processing goes to the step SP7. If a transit route to an aimed position (or motion) is found, the route (arc) $a_k$ (where k is an integer up to n including 0) is stored and this becomes information of a position transit plan.

In the step SP6, the command storage part 61 erases the command from the list, considering that no motion route is found. By thus erasing the command if no motion route is found, a subsequent command can be picked up. After thus erasing a command, the command storage part 61 determines again whether or not there is a command that can be started, in the step SP 3.

In the step SP7, i=0 is set. Irt the subsequent step SP8, whether or not i is n or less is determined. The case where i is n means that an aimed position or motion is completed. That is, the n-th arc is an oriented arc an which directly transits to an auned node or an aimed self-motion arc an. If i=0 is satisfied, i is confirmed as being n or less at least in this step SP8.

If i is n or less, the processing goes to the step SP10. Otherwise, if i is greater than n, the processing goes to the step SP9.

In the step SP10, the control mechanism part 43 performs production of an arc $a_i$, based on position transit information S18 supplied from the route search part 62. For example, if the robot apparatus is at the current position (first position), as shown in FIG. 30, the motion of the first oriented arc $a_0$, is carried out.

In the step SP11, the route search part 62 receives a notification of a motion. In the step SP12, the graph storage part 63 updates the position on the graph.

In the subsequent step SP13, i=i+1 is set as i to execute a next arc, to achieve an increment. Subsequently, the processing returns to the step SP8, and whether or not i is n or less is determined again.

In the step SP9 whose processing is carried out if i is greater than n, i.e., if a motion to an aimed position is executed or if an arc (oriented arc or self-motion arc) as an aimed motion is executed, the command storage part 61 erases a command which has just been finished from stored commands. Further, the processing returns to the step SP3, and the command storage part 61 determines again whether or not there is a command that can be started.

If an aimed position or motion is associated with the entire apparatus and the componential parts, an optimal route is searched on the graphs corresponding to them in the steps SP5 and SP6, as has been explained with reference to FIGS. 23 and 24. In the processing from the step SP7, corresponding processing is carried out. That is, the position is let transit to a basic position, and the contents of an oriented arc to an aimed position or motion are executed.

Also, the commands are stored into the command storage part 61 as has been described above. Since resources do not compete with each other, the respective componential parts of the robot apparatus 1 can perform simultaneous notions, based on such a command. Hence, with respect to the processing procedure (flow) as described above, flows of respective componential parts can exist in parallel with each other, so that a plurality of flows can be executed simultaneously. Accordingly, in case where a flow of a command concerning the entire apparatus is being processed, processing of flows of commands concerning respective componential parts is not carried out but is put in a standby state.

(4) Motion and Effect

In the structure as described above, the feeling/instinct model part 40 of the controller 32 changes the states of the feeling and instinct of the robot apparatus 1, based on supplied input information S1 to S3. The changes of the feeling and instinct of the robot apparatus 1 are reflected on actions of the robot apparatus 1, thereby to let the robot apparatus 1 move autonomously, based on its own feeling and instinct.

Further, various positions and motions are let transit on the basis of graphs which register nodes and arcs, thereby to enable various expressions by the robot apparatus 1.

That is, it is possible to have a large number of expression patterns depending on a combination of motions by using previously registered graphs. Also, natural and smooth transit of position from the current position to an aimed position or motion can be realized, so that balance is not unintentionally lost during a motion.

(5) Other Embodiments

The above embodiment has been explained with respect to the case where a command from a user, which is transmitted by infrared light from a remote controller, is received. However, the present invention is not limited hitherto but a command from a user, which is transmitted by a radio wave or a sound wave can be received.

Also, the above embodiment has been explained with respect to the case where a command from a user is inputted through a command receiving part 30 comprised of a remote controller receiving part 13 and a microphone 11. However, the present invention is not limited hitherto. For example, a computer may be connected to a robot apparatus 1, and a command from a user can be inputted through the computer thus connected.

Also, the above embodiment has been explained with respect to the case where states of the feeling and instinct are determined with user of emotion units 50A to 50F indicating emotions such as "delight", "sorrow", "anger", and the like as well as desire units 51A to 51D indicating "desire for motion", "desire for love", and the like. The present invention, however, is not limited hitherto. For example, an emotion unit indicating "loneliness" may be added to the emotion units, and a desire unit indicating a "desire for sleep" may be added to the desire units 51. Furthermore, the states of the feeling and the instinct may be determined by using emotion units and desire units constructed by various kinds of units or a various number of units.

The above embodiment has been explained with respect to a structure in which the robot apparatus 1 has a feeling model and an instinct model. However, the present invention is not limited hitherto but the structure may include only the feeling model or instinct model. Furthermore, the structure may include another model that will decide the action of an animal.

Also, the above embodiment has been explained with respect to the case where a next action is determined by an action determination mechanism part 41, based on a command signal S1, an external information signal S2, an internal information signal S3, feeling/instinct state information S10, and action information S12. However, the present invention is not limited hitherto but a next action may be determined on the basis of a part of the information of the command signal S1, external information signal S2, internal information signal S3, feeling/instinct state information S10, and action information S12.

Also, the above embodiment has been explained with respect to the case where a next action is determined with use of an algorithm called a finite automation 57. The present invention, however, is not limited hitherto, but an action may be determined with use of an algorithm called a state machine which has an infinite number of states. In this case, a state may be newly generated every time when input information S14 is supplied, and an action may be determined in accordance with the state thus generated.

Also, the above embodiment has been explained with respect to the case where an algorithm called finite automation 57 is used to determine a next action. The present invention, however, is not limited hitherto but an action may be determined with use of an algorithm called probability finite automation in which a plurality of states are selected as candidates of a transit destination, based on the input information S14 currently supplied and the state at this time, and the state of the transit destination is determined at random by means of random numbers, among the plurality of states thus selected.

Also, the above embodiment has been explained with respect to the following case. That is, if action command information S16 indicates a position to which the current position can directly transit, the action command information S16 is sent directly as position transit information S18 to the control mechanism part 43, without changes. On the other hand, if the action command information S16 indicates a position to which the current position cannot directly transit, such position transit information S18 that lets the position once transit to another position to which the current position can transit and thereafter lets the position transit to an aimed position is generated and sent to the control mechanism part 43. However, the present invention is not limited hitherto but action command information S16 is received and sent to the control mechanism part 43, only in case where the action command information S16 indicates a position to which the current position can directly transit. Meanwhile, if the action command information S16 indicates a position to which the current position cannot directly transit, the action command information S16 may be denied.

Figure 31:
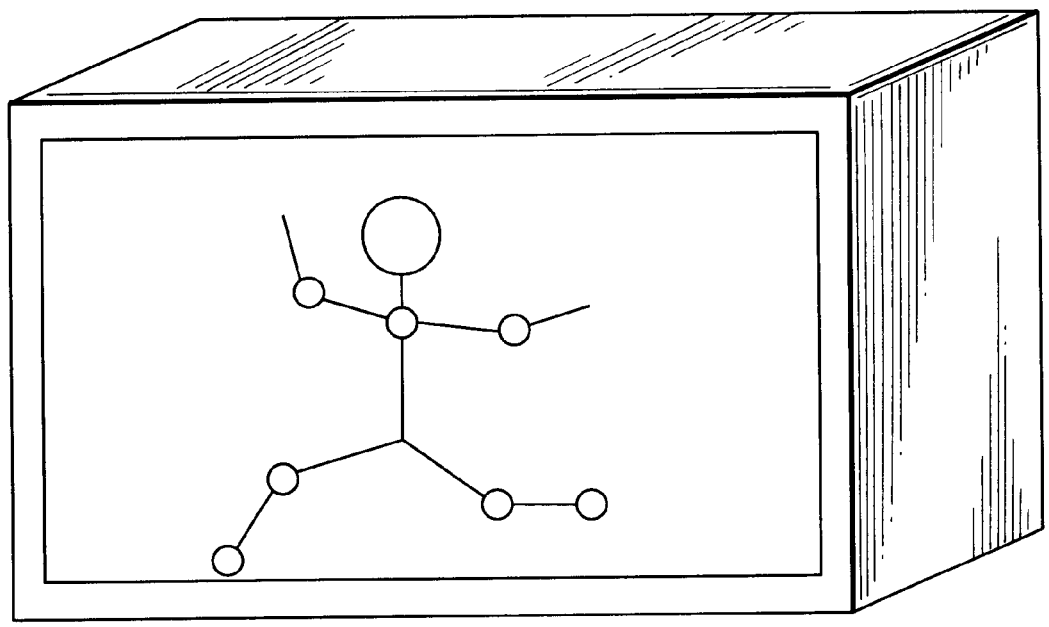
FIG. 31 is a view showing another example to which the present invention is applied, wherein a character which moves as a computer graphic.

Also, the above embodiment has been explained with respect to the case where the present invention is applied to a robot apparatus 1. However, the present invention is not limited hitherto but may be applied to other various robot apparatuses such as a robot apparatus and the like used for games or in the field of entertainment. As shown in FIG. 31, the present invention can be applied to a character which moves as computer graphics, e.g., an animation or the like using an articulated character.

Figure 32:
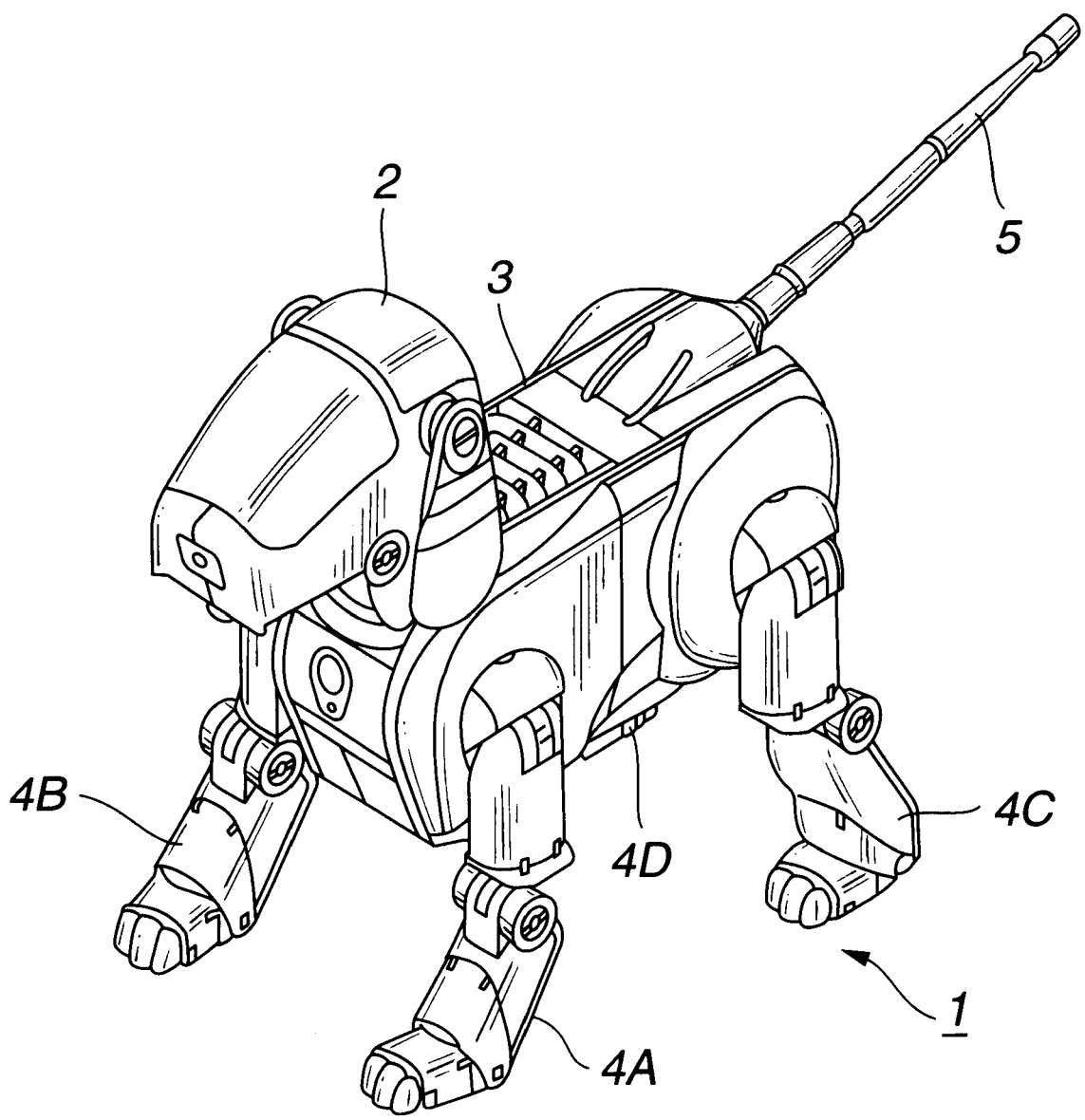
FIG. 32 is a perspective view showing another embodiment of a robot apparatus according to the present invention.

The outer appearance of the robot apparatus 1 to which the present invention is applied is not limited to the structure as shown in FIG. 1 but may be arranged to be more similar to an actual dog, as shown in FIG. 32, or may be arranged to be a humanoid robot having a human shape.

Industrial Applicability

A robot apparatus according to the present invention makes a motion corresponding to supplied input information, and comprises model change means including a model, which causes the motion, for determining the motion by changing the model, based on the input information. Therefore, the robot apparatus can autonomously act based on states of the feeling and instinct of the robot apparatus, by changing the model, based on input information, thereby to determine a motion.

A motion control method according to the present invention is to make a motion in accordance with supplied input information, and the motion is determined by changing a model which causes the motion, based on the input information. As a result, the robot apparatus can act autonomously based on the states of its own feeling and instinct.

Another robot apparatus according to the present invention makes a motion in accordance with supplied input information, and comprises motion determination means for determining a next operation subsequent to a current motion, based on the current motion and the input information supplied next, said current motion corresponding to a history of input information supplied sequentially. Therefore, the robot apparatus autonomously can act based on the states of its own feeling and instinct, by determining a next motion subsequent to a current motion, based on the current motion corresponding to a history of input information supplied sequentially, and the input information supplied next.

Another motion control method according to the present invention is to make a motion in accordance with supplied input information, and a next motion subsequent to a current motion is determined, based on the current motion and the input information to be supplied next, the current motion corresponding to a history of input information supplied sequentially. As a result, the robot apparatus can act autonomously, based on the state of its own feeling or instinct, for example.

Further, another robot apparatus according to the present invention comprises: graph storage means for storing a graph which registers the positions and the motion and which is constructed by connecting the positions with the motion for letting the positions transit; and control means for searching a route from a current position to an aimed position or motion, on the graph, based on the action command information, and for letting the robot apparatus move, based on a search result, thereby to let the robot apparatus transit from the current position to the aimed position or motion. Therefore, a route from the current position to the aimed position or motion is searched on the graph by the control means, and a motion is made on the basis of the search result. The current position can thus let transit to the aimed position or motion. In this manner, the robot apparatus can enrich its own expressions.

Further, in another motion control method according to the present invention, based on action command information, a route from a current position to an aimed position or motion is searched on a graph which registers positions and motions and which is constructed by connecting the positions with motions for letting the positions transit, and a motion is made, based on a search result, thereby to make transit from the current position to the aimed position or motion. As a result, it is possible to enrich expressions of a robot apparatus and a character which moves as a computer graphic.

What is claimed is:

1. A robot apparatus which makes a motion corresponding to supplied input information, comprising:

model change means including a model for causing the motion and for determining the motion by changing the model, based on the input information;

said model change means including a feeling model for expressing a feeling through a motion, as the model, or an instinct model for expressing an instinct through a motion, as a model having a property different from the feeling model; and said model change means changing the feeling model, based on the input information, thereby changing a feeling state for causing the motion, or changing the instinct model, based on the input information, thereby changing an instinct state for causing the motion.

2. The robot apparatus according to claim 1, wherein the model change means uses a plurality of models having different properties, as the model.

3. The robot apparatus according to claim 2 wherein the model change means a feeling model for expressing a feeling through a motion, as a first property model, and an instinct model for expressing an instinct through a motion, as a second property model, and wherein the model change means changes the feeling model, based on the input information, thereby to change a feeling state for causing the motion, and changes the instinct model, based on the input information, thereby to change an instinct state for causing the motion.

4. The robot apparatus according to claim 2, wherein the model change means has a plurality of kinds of models with respect to each of the models having different properties.

5. The robot apparatus according to claim 4, wherein the model change means changes individually levels of the plurality of kinds of models of the plurality of models having different properties, based on the input information, thereby to change the state which causes the motion.

6. The robot apparatus according to claim 4, wherein the model change means changes desired models among the models having different properties, with the desired models influencing each other.

7. The robot apparatus according to claim 2, wherein the model change means changes the models having different properties which are influencing each other.

8. The robot apparatus according to claim 1, wherein the model change means has a plurality of kinds of models, as the model, with respect to one same property.

9. The robot apparatus according to claim 8, wherein the model change means changes individually levels of the plurality of kinds of models, based on the input information, thereby to change the state which causes the motion.

10. The robot apparatus according to claim 1, wherein the model change means changes the model in accordance with an action of the robot apparatus.

11. The robot apparatus according to claim 1, wherein the model change means changes the model in a way inherent to the robot apparatus itself.

12. The robot apparatus according to claim 1, wherein the input information is constructed by user command information supplied to the robot apparatus from a user.

13. The robot apparatus according to claim 1, wherein the input information is constructed by an action on the robot apparatus from a user.

14. The robot apparatus according to claim 1, wherein the input information is constructed by environmental information around the robot apparatus.

15. The robot apparatus according to claim 14, wherein the input information is constructed by information concerning a motion of another robot apparatus existing around the robot apparatus.

16. The robot apparatus according to claim 1, wherein the input information is constructed by information concerning a condition inside the robot apparatus.

17. The robot apparatus according to claim 1, wherein the input information is constructed by information concerning a current or past action of the robot apparatus.

18. A motion control method of making a motion in accordance with supplied input information, comprising the steps of:

changing a model which causes the motion, based on the input information, thereby determining the motion;

wherein said model is a feeling model for expressing a feeling through a motion, or an instinct model having a property different from that of the feeling model, for expressing an instinct through a motion; and changing a feeling state which causes the motion if the feeling model is changed based on the input information, or changing an instinct state which causes the motion if the instinct model is changed based on the input information.

19. The method according to claim 18, wherein the model is a feeling model for expressing a feeling through a motion, and an instinct model for expressing an instinct through a motion, as a model of a second property, and wherein the feeling model is change, based on the input information, thereby to change a feeling state which causes the motion, and the instinct model is changed, based on the input information, thereby to change an instinct state which causes the motion.

20. A robot apparatus which makes a motion in accordance with supplied input information, comprising motion determination means for determining a next operation subsequent to a current motion, based on the current motion and the input information supplied next, said current motion corresponding to a history of input information supplied sequentially; and said input information is constituted by combining all or part of user command information supplied from a user, information concerning an action from the user, information concerning an environment, information concerning a condition inside the robot apparatus, information concerning a current or past action, and information concerning a state of a feeling and/or an instinct.

21. The apparatus according to claim 20, wherein the motion determination means determines the next motion with use of finite automation having a finite number of motions.

22. The apparatus according to claim 20, wherein the motion determination means uses probability-finite automation by which a plurality of motions are selected as candidates for a transit destination, based on the current motion and the input information, and a desired motion among the selected plurality of motions is determined at random by random numbers.

23. The apparatus according to claim 20, wherein the motion determination means uses a fact that a time for which a current motion has been being executed reaches a predetermined value, a fact that specific input information is inputted, or a fact that a level of a desired feeling model or instinct model among a plurality of kinds of feeling models and a plurality of kinds of instinct models that determine states of a feeling and instinct of the robot apparatus exceeds a predetermined threshold value, as a condition for letting the current motion transit to the next motion.

24. The apparatus according to claim 20, wherein the motion determination means determines a motion as a transit destination, based on whether or not a level of a desired feeling model or instinct model among a plurality of kinds of feeling models and a plurality of kinds of instinct models that determine states of a feeling and an instinct exceeds a predetermined threshold value.

25. The apparatus according to claim 20, wherein the motion determination means changes a parameter which characterizes an action to be carried out as a motion at a transit destination, in correspondence with a level of a desired feeling model or instinct model among a plurality of kinds of feeling models and a plurality of kinds of instinct models that determine states of a feeling and an instinct exceeds a predetermined threshold value.

26. A robot apparatus which is let make a motion, based on action command information, to transit between a plurality of positions, comprising:

graph storage means storing a graph which registers the positions and the motion and which is constructed by connecting the positions with the motion for letting the positions transit; and control means for searching a route from a current position to an aimed position or motion, on the graph, based on the action command information, and for letting the robot apparatus move, based on a search result, thereby to let the robot apparatus transit from the current position to the aimed position or motion.

27. The apparatus according to claim 26, further comprising action command information storage means for temporarily storing the action command information, wherein the control means searches a route from the current position to the aimed position or motion, on the graph, based on the action command information sequentially supplied from the action command information storage means.

28. The apparatus according to claim 27, wherein the action command information is added with additional information concerning the action command information.

29. The apparatus according to claim 28, wherein the additional information is the command operation information, and wherein the action command information storage means performs an operation on newly supplied action command information and previously supplied action command information, based on the command operation information.

30. The apparatus according to claim 28, wherein the additional information is delayed input information which instructs contents of a motion in details, and wherein the control means controls finely the aimed motion, based on the detailed input information.

31. The apparatus according to claim 30, wherein the detailed input information is information concerning a parameter of a motion, and wherein the control means executes the aimed motion in accordance with the parameter.

32. The apparatus according to claim 30, wherein the detailed input information is information concerning a number of repetitions of a motion, and wherein the control means repeatedly executes the aimed motion, based on information concerning the number of repetitions.

33. The apparatus according to claim 30, wherein the detailed input information is information concerning a repetitive motion, and wherein the control means executes the aimed motion until information concerning an end of repetition is inputted.

34. The apparatus according to claim 26, wherein motions on the graphs are added with weights, and wherein the control means searches a route with reference to the weights.

35. The apparatus according to claim 34, wherein the control means searches a route which sets a sum of the weights to a minimum value.

36. The apparatus according to claim 26, wherein the control means searches a route in correspondence with a physical shape and a mechanism.

37. The apparatus according to claim 26, wherein an entire of the robot apparatus is constructed by a plurality of componential parts, wherein the graph storage means stores a plurality of graphs respectively corresponding to the entire and the componential parts, and wherein the control means searches route with respect to the entire and the componential parts on the graphs, respectively, and lets the entire and the componential parts move, based on each search result.

38. The apparatus according to claim 37, wherein a basic position common to the entire and the componential parts is registered on the plurality of graphs, and wherein the control means searches a route from the current position to the aimed position or motion, between the graphs through the basic position, when the current position and the aimed position or motion bridge over the entire and the componential parts.

39. The apparatus according to claim 37, wherein the action command information is added with synchronization information for synchronizing a motion with a different componential part, and wherein the control means lets the different componential part move synchronously, based on the synchronization information.

40. The apparatus according to claim 26, wherein the control means execute a motion of transiting from the current position to the aimed position, with an expression added.

41. The apparatus according to claim 26, wherein a plurality of equal motions are registered on the graph, and wherein the control means searches a route to one of the plurality of equal motions, referring at least to the current position, when the plurality of equal motions are instructed by the action command information.

42. The apparatus according to claim 41, wherein the control means searches a route to one of the plurality of equal motions that is the shortest and is executable.

43. The apparatus according to claim 26, wherein a neutral position is registered on the graph, and wherein the control means once sets the neutral position and then lets the neutral position transit to the aimed position or motion, when an actual position is unclear.

44. The apparatus according to claim 43, wherein the control means sets the neutral position through a slower motion than a normal motion in a normal transit.

45. A motion control method for making a motion, based on action command information, thereby to control transit between a plurality of positions, comprising the steps of:

searching, based on the action command information, a route from a current position to an aimed position or motion on a graph which registers the positions and the motion and which is constructed by connecting the positions with a motion for letting the positions transit, and executing a motion based on a search result, thereby to make transit from the current position to the aimed position or motion.

46. The method according to claim 45, wherein the action command information is temporarily stored in action command information storage means, and wherein a route from the current position to the aimed position or motion is searched on the graph, based on the action command information sequentially supplied from the action command information storage means.

47. The method according to claim 45, wherein motions on the graph are added with weights, and a route is searched with reference to the weights.

48. The method according to claim 45, wherein a motion of a robot apparatus which can transit to a plurality of positions.

49. The method according to claim 48, wherein an entire of the robot is constructed by a plurality of componential parts, and wherein the route is searched with respect to the entire and the componential parts, on a plurality of graphs respectively corresponding to the entire and the componential parts, and the entire and the componential parts are moved, based on search results, respectively.

* * * * *